United States Patent
Drakulich et al.

[11] Patent Number: 5,883,815
[45] Date of Patent: Mar. 16, 1999

[54] LEAK DETECTION SYSTEM

[76] Inventors: Dushan Drakulich; M. Cueva-Eguiguren, both of 534 Broadhollow Rd., Suite 270, Melville, N.Y. 11747

[21] Appl. No.: 666,210

[22] Filed: Jun. 20, 1996

[51] Int. Cl.⁶ .................. G01M 3/04; G01M 3/28
[52] U.S. Cl. .................. 364/509; 364/510; 73/40; 73/492; 73/592; 340/501; 340/605
[58] Field of Search .................. 364/509, 510, 364/571.01, 557, 558; 73/40, 492, 592; 340/501, 605; 324/532, 535

[56] References Cited

U.S. PATENT DOCUMENTS

| | | | |
|---|---|---|---|
| 3,981,181 | 9/1976 | Ochiai | 73/40.5 |
| 4,480,251 | 10/1984 | McNaughton et al. | 340/604 |
| 4,570,477 | 2/1986 | Sugibucki | 73/40.5 |
| 4,835,522 | 5/1989 | Andrejasich et al. | 340/521 |
| 4,852,054 | 7/1989 | Mastandrea | 364/509 |
| 5,091,761 | 2/1992 | Nelson et al. | 340/605 |
| 5,372,032 | 12/1994 | Filippi et al. | 73/40.5 |
| 5,410,255 | 4/1995 | Bailey | 324/525 |
| 5,526,679 | 6/1996 | Filippi et al. | 364/509 |
| 5,557,965 | 9/1996 | Fiechtner | 73/49.2 |

*Primary Examiner*—Emuanel T. Voeltz
*Assistant Examiner*—Bryan Bui

[57] ABSTRACT

A method for thermal volume modeling of the pipe fluid volume change by taking temperature change measurements of pipe fluid taken at a single location, and comparing it to the changes in the fluid volume inside a tank hydraulically connected to a said pipe; a method of determining a fluid leak by comparing a calculated fluid volume inside a tank(s) and the actually measured tank fluid volume, where calculations are based on the method.

24 Claims, 22 Drawing Sheets

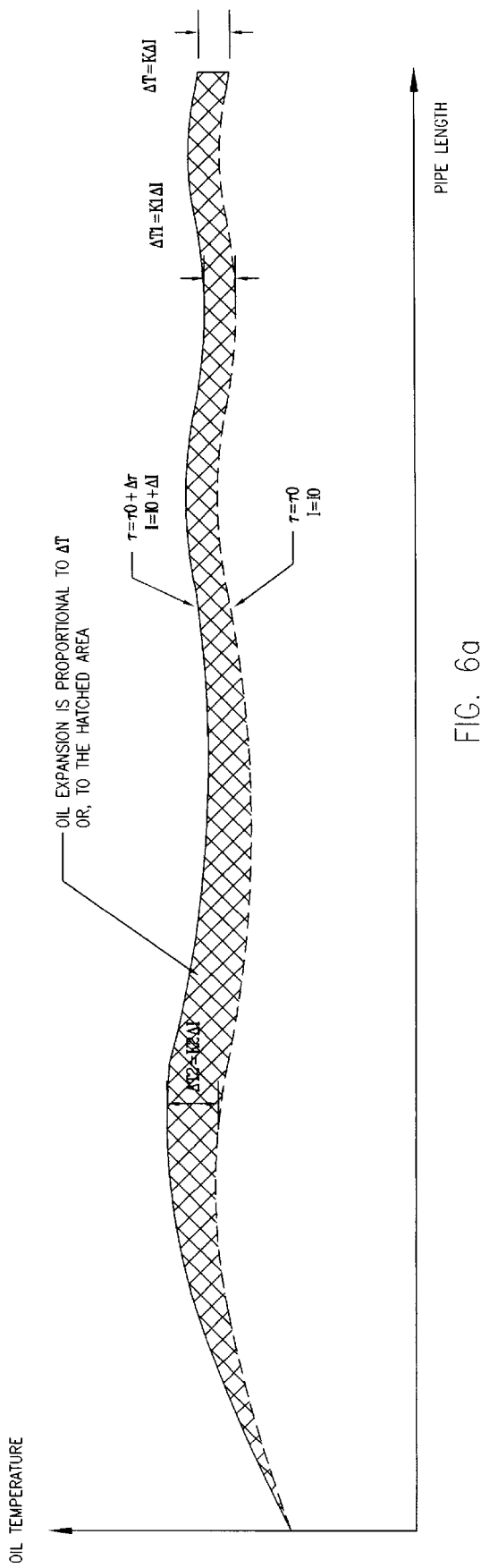

CONTINUED ON FIG. 9b

NOTE: TERM "PUMP" IN THIS FLOW CHART REFERS TO PRESSURIZATION PUMP ONLY WHEN PUMP STARTS. A SINGLE PUMP TIMER STARTS AND A SINGLE PUMP TIMER FLAG IS SET.

LEAK DETECTION SYSTEM

BACKGROUND OF THE INVENTION

1. Field of the Invention

The present invention relates to detection of leaks. More particularly, the present invention relates to detection of oil leaks in pipes with electrical transmission piped-type cables.

2. Description of the Prior Art

Current installed leak detection systems for fluid pipe systems such as underground piped-type cables and others, use pressure decay and/or flow monitoring in order to determine if a leak exists. Leak Detection Systems for oil pipe systems such as underground piped-type cables and others, monitor the pressure in the pipe or oil tank to interpret pressure drops. In addition, in some cases the frequency of pressurization pumps starts is used as an indication of larger oil leaks. However, these systems often initiate false leak detection alarms when a heat source is removed, such as de-energizing the electric underground cable, resulting in fast cooling of the oil. This causes decreases the interrelated oil volume and pressure inside the oil pipe or tanks setting off the alarm. Other methods include systems which monitor the flow of oil in the pipes, such as underground piped-type cables and others, interpret the differences in flow at different pipe locations to detect leakages.

When the accuracy of oil tank level gages, flow meters, and temperature variations of the oil inside the pipe or tanks is taking into account, detecting leakages of oil becomes very difficult. Resulting in the detection of only large oil leaks as a result of prolonged small oil losses having accumulative effects, or more rapid oil loss having little drag effect.

Past attempts to compensate for the temperature changes of the oil inside the pipe or oil tanks, such as piped-type cables and other systems, face two (2) obstacles:

1. The temperature of the oil along the pipes, such as underground piped-type cables and other systems, typically varies along the pipe, and a large number of measuring devices is required in order to monitor oil temperature. This is not practical or economical. In addition, temperature monitoring along the pipe is very difficult and expensive for existing oil pipes.
2. Small leakages are difficult to detect in existing leak detections systems due to the accuracy of the instrumentation used at the present time (instrument errors). This is more apparent when oil pipes, such as piped-type cables and other systems, may contain oil volumes ranging typically between 100,000 to 200,000 gallons. Even with the assumption that the calculated oil volume in the pipe is accurate, leak detection accuracy due to temperature effects and accuracy in the measuring instrumentation yields results with sensitivity that is unacceptable from the environmental point of view (500–1,000 gallons).

For actual electrical underground transmission systems, a traditional leak detection method consists of monitoring the amount of oil in the system by reviewing and comparing oil tank level readings that are recorded on charts recordings. These readings are taken continuously during seven day periods and then they are sent to an engineering office for further analysis. This way, the leaks are detected only after substantial accumulation of oil loss.

Numerous innovations for Leak Detection System have been provided in the prior art that are described as follows. Even though these innovations may be suitable for the specific individual purposes to which they address, they differ from the present invention as hereinafter contrasted.

In U.S. Pat. No. 5,410,255, titled Method and Apparatus for Detecting and Distinguishing Leaks Using Reflectometry and Conductive Tests, invented by Douglas S. Bailey, a method and apparatus for detecting and locating fluid leaks, particularly liquid leaks, and determining whether the leaking liquid being detected is non-conductive liquid such as hydrocarbon or conductive liquid such as water utilizes a composite detection cable having a pair of insulated conductors and a pair of un-insulated conductors. Pulses are applied to the insulated conductors and leaks are detected and located utilizing time domain reflectometry (TDR) techniques. The resistance between the un-insulated conductors is measured to determine whether or not the leak is conductive.

The patented invention differs from the present invention because the patented invention requires a special cable having a leak detecting cable embedded within the primary cable. Time Domain Reflectometery is used to detect the leak. The present invention measures one temperature at the output of a cable at a given pressure and the volume in a reservoir tank at the same time. A second temperature and volume measurement is made some time later at the same pressure. The changes in temperature and volume are compared to determine if a leak is occurring.

In U.S. Pat. No. 5,372,032, titled Pressurized Piping Line Leak Detector, invented by Ernest A Flippi and Kenneth L. Miller, a line leak detector system which does not require modifications to existing piping or installation. The system requires a controller and transducer and installs at existing fuel dispensers. The two components are connected by a length of electrical cable. The invention detects leaks in underground pressurized piping systems for fuel products and other incompressible liquids. The system performs three levels of leak detection, broken pipe, 3 gph and 0.2 gph. Existing piping systems variables relating to bulk modules, variable pump off pressure and thermal differential between fuel and piping with surrounding soil influence, are compensated for. The status of the leak test is reported by encoded lights and horn. In various combination of flash, blink and steady state lights plus chirp, or audible horn. The transducers and cable are intrinsic safe, permitting installation in hazardous environments. The system permits selection of functional modes, thereby making the system able to report leak status to existing underground fuel tank inventory systems.

The patented invention differs from the present invention because the patented invention measures only pressure changes compensated for temperature and bulk modulus. The present invention measures one temperature at the output of a cable at a given pressure and the volume in a reservoir tank at the same time. A second temperature and volume measurement is made some time later at the same pressure. The changes in temperature and volume are compared to determine if a leak is occurring.

In U.S. Pat. No. 4,570,477, titled Leak Detecting Cable, invented by Hiroyuki Sugibucti, a liquid leak detecting sensor in cable form is provided wherein an element of the cable material which is easily deformable and which on deformation, maintains the cable in deformed configuration.

The patented invention differs from the present invention because the patented invention requires a specially constructed cable that has a pair of sensing wires that sense the leakage of a conductive liquid. The present invention measures one temperature at the output of a cable at a given pressure and the volume in a reservoir tank at the same time. A second temperature and volume measurement is made some time later at the same pressure. The changes in temperature and volume are compared to determine if a leak is occurring.

In U.S. Pat. No. 4,480,251, titled Apparatus to Monitor Electrical Cables, Including Splice Joints and the like, of the ingress of Moisture, invented by John P. McNaughton, Wayne E. Domenco, and David E. Vickey, Apparatus for monitoring electrical cables for the presence of moisture within the cable along the full length of the cable and at specific points such as splices along its length comprised of a pair of dielectrically separated conductors arranged along a central station and remote stations along the length of the cable at the specific stations to be monitored. The remote stations each include a further dielectrically separated pair of conductors for sensing moisture at the point and signals along the first pair of conductors to the central station. The central station detects moisture by an increase in current in the conductors and also detects a signal from remote stations. Branch cables spliced into the main cable include dielectrically separated conductors also spliced into the main conductors with the remote station at the splice including means for disconnecting the branch cable conductors from the main cable conductor under control from a signal from the central station.

The patented invention differs from the present invention because the patented invention detects the presence of outside moisture inside a cable. The patented invention is not designed to function in conjunction with a liquid filled cable. The present invention measures one temperature at the output of a cable at a given pressure and the volume in a reservoir tank at the same time. A second temperature and volume measurement is made sometime later at the same pressure. The changes in temperature and volume are compared to determine if a leak is occurring.

In U.S. Pat. No. 3,981,181, titled Method of Detecting Liquid Leak and a Cable Therefor, invented by Sadamasa Ochiai in the method for detecting liquid leak of the present invention, the inventive cable, I.E. a parallel pair or a coaxial cable insulated with porous polymer material, is placed along or under a storage and/or transport means for conveying chemicals. If a leak occurs, the leaked liquid permeates into two conductors from each other, and varies the characteristic impedance of the cable to some detectable extent. The variation of impedance is electrically measured by a pulse reflection method (TDR). The invention method comprises; sending pulse waves from one end of the cable, sensing the reflected and deformed pulse shape, and thus detecting and locating the liquid leak.

The patented invention differs from the present invention because the patented invention utilizes a parrallel pair or a coaxial cable insulated with porous polymer material. If a leak occurs, the leaked liquid permeates into two conductors varying the characteristic impedance of the cable to some detectable extent. The patented invention requires a specially built cable. If a leak occurs, the leaked liquid permeates into two conductors from each other, and varies the characteristic impedance of the cable to some detectable extent.

Numerous innovations for Leak Detection System have been provided in the prior art that are adapted to be used. Even though these innovations may be suitable for the specific individual purposes to which they address, they would not be suitable for the purposes of the present invention as heretofore described.

SUMMARY OF THE INVENTION

An economical and simple oil leak detection based on oil volume monitoring can be accomplished without collecting temperature data along the pipe for underground transmission systems, and calculating the change of estimated (calculated) volume of oil inside the pipe. Because the major heat source to the oil inside the pipe is uniform along the pipe-line, a single temperature monitoring point is sufficient to provide indication of a pipe oil temperature expansion. This is valid because the change of oil temperature is the only relevant factor affecting the oil thermal expansion. This is also applicable to the pipe and cable volume changes due to the temperature changes. The consequence of the temperature change is easily monitored by measuring a tank oil volume change at one or both ends of the cable or pipe.

The types of problems encountered in the prior art are that the changes of oil volume inside the large volume pipe are consequence of thermal expansion or contraction due to numerous factors, in addition to possible leaks. Such volume changes substantially exceed volumes detectable by existing pressure decay leak detection systems, making them inappropriate for large volume pipe leak detection systems.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING 10-leak detection system (10)
CONTINUOUS MONITORING OF LINE TEMPERATURES FLOW DIAGRAM
   12-line temperature monitoring (12)
   12A-starting (12A) line temperature monitoring
   12B-waiting (12B) a time period
   12C-retrieving (12C) last recorded temperatures
   12D-reading and storing (12D) current line temperatures from temperature sensor (26C . . . )
   12E-calculating and storing (12E) temperature changes
   12F-reading (12F) last recorded accumulated temperature changes
   12G-calculating (12G) new accumulated line temperature changes
   12H-updating (12H) new accumulated line temperature changes
   12I-reading and storing (12I) current line temperatures from temperature sensor (26C . . . )
CONTINUOUS MONITORING OF PRESSURE AND PRESSURE DECAY LEAK DETECTION OPERATION FLOW DIAGRAM
   14-pressure and pressure decay monitoring (14)
   14A-starting (14A) pressure and pressure decay monitoring
   14B-waiting (14B) a time period
   14C-retrieving (14C) last recorded pressure
   14D-reading (14D) current pressure from pressure sensor (28)
   14E-calculating (14E) pressure decay rate
   14F-storing (14F) pressure and pressure decay rate, reset and start system pressure timer
   14G-testing (14G) alarm reset
   14H-clearing (14H) pressure alarm flag and volume alarm flag
   14I-determining (14I) if alarm pressure flag is set
   14J-determining (14J) if pressure decay is greater than a preselected value 14K-tripping (14K) alarm function
14L-reading (14L) current pressure from pressure sensor (28)
14M-storing(14M) pressure, reset and start system pressure timer SNAPSHOT VOLUME COMPARISONS LEAK DETECTION OPERATION FLOW DIAGRAM
16-snapshot volume calculations (16)
16A-starting (16A) volume calculation
16B-executing (16B) triggering logic
16C-reading (16C) accumulated line temperature changes
16D-calculating (16D) acceptable volume deviation
16E-clearing (16E) accumulated line temperature changes (starting new accumulation)
16F-calculating (16F) temperature differences
16G-calculating (16G) volume adjusted for temperature
16H-calculating (16H) volume difference
16I-writing (16I) collected and calculated data including flags
16J-determining (16J) if volume change is smaller than a currently acceptable value
16K-determining (16K) alarm flag status
16L-determining (16L) invalid flag status
16M-tripping (16M) alarm function
16N-reporting (16N) invalid readings CALIBRATION
18-calibrating (18)
18A-starting (18A) calibration
18B-clearing (18B) PLC registers and flags
18C-reading (18C) operator inputs
18D-calculating and storing (18D) $K_D$ factor
18E-calculating and storing (18E) $D_{ACCR}$
18F-running (18F) line temperature monitoring (12) and pressure and pressure decay monitoring (14)
18G-calculating and storing (18G) $\lambda n$ for each pipe
18H-activating (18H) snapshot volume calculations (16)

CALIBRATION DATA GATHERING
20-gathering (20) calibration data
20A-starting (20A)
20B-setting (20B) 'first' flag
20C-clearing (20C) accumulated line temperature changes data
20D-executing (20D) triggering logic
20E-reading and storing (20E) accumulated line temperature changes data
20F-determining (20F) 'first' flag status
20G-determining (20G) 'unstable' flag status
20H-calculating (20H) accumulated temperature differences from last stored valid calibration reading
20I-determining (20I) increase in temperature change for all pipes
20J-clearing (20J) 'unstable' flag (entering waiting for stable temperature mode)
20K-clearing (20K) 'first' flag
20KK-setting (20KK) 'second' flag (marking second passage)
20L-determining (20L) sufficiently slow line temperature changes (valid calibration reading)
20M-setting (20M) stable flag
20N-calculating and storing (20N) sum of accumulated line temperature changes in calibration values
20O-determining and clearing (20O) 'second' flag
20P-determining (20P) change in sum of accumulated line temperature changes
20Q-clearing (20Q) stable flag
20R-determining (20R) stable flag status
20S-storing (20S) line temperatures and sum of all tank volumes
20T-determining (20T) if all line base temperatures equal zero (establishing first calibration data set)
20U-storing (20U) previous line temperatures and tank oil volumes as base values
20V-storing (20V) previous line temperatures and tank oil volumes as valid readings
20VV-setting (20VV) unstable flag
20W-determining (20W) all first calibration line temperature differentials equal to zero
20X-calculating (20X) accumulated temperature differences
20Y-comparing (20Y) accumulated temperature differences to a minimum value
20Z-calculating and storing (20Z) accumulated temperature differences from a base and accumulated volume differences from a base
20AA-determining (20AA) all second calibration line temperature differentials equal to zero
20AB-calculating (20AB) accumulated temperature differences
20AC-comparing (20AC) accumulated temperature differences to a minimum value to a minimum value
20AD-calculating and storing (20AD) accumulated temperature differences from a base and accumulated volume differences from a base
20AE-calculating (20AE) accumulated temperature differences
20AF-comparing (20AF) accumulated temperature differences to a minimum value
20AG-calculating and storing (20AG) accumulated temperature differences from a base and accumulated volume differences from a base
20AH-returning (20AH) to main program LEAK DETECTION SYSTEM, FIGS. 1, 2, 3, 6b
24A-first volume sensor (24A)
24B-second volume sensor (24B)
26A-first volume temperature sensor (26A)
26B-second volume temperature sensor (26B)
26C-first line temperature sensor (26C)
26D-second line temperature sensor (26D)
28-pressure sensor (28)
29-first line (29)
30-electrical cable (30)
32-fluid (32)
34A-first pump (34A)
34B-second pump (34B)
36-relief valve (36)
38-first tank (38)
39-second tank (39)
40-second line (40)
41-pressurizing line (41)

TRIGGERING SNAPSHOT READINGS FOR FORCED FLOW AND STATIONARY PIPE CONFIGURATIONS
110-triggering snapshot for forced flow and stationary pipes (110)
118-starting (118) snapshot readings
120-testing (120) 'first' flag
121-clearing (121) trigger timer flag and pump timer flag
122-resetting (122) trigger timer and pump timer
123-determining and clearing (123) invalid flag
124-conditional waiting (124) one time period
125-clearing (125) invalid flag
126-testing (126) first pump (34A) status
128-setting (128) pump timer flag
129-starting (129) pump timer
130-testing (130) first pump (34A) status
132-clearing (132) pump timer flag 133-resetting (133) pump timer
136-reading and calculating (136) pressure and offset from pressure set point
138-determining (138) if pressure offset is less than a preselected value
140-reading (140) temperature from temperature sensor (26A, 26B, 26C, 26D) and volume from volume sensors (24A & 24B)
142-clearing (142) trigger timer flag
143-resetting and starting (143) trigger timer
144-returning (144) to parent module
146-clearing (146) pump timer flag
147-resetting (147) pump timer
148-determining (148) trigger timer status
150-setting (150) trigger timer flag
152-determining (152) pump timing condition
154-tripping (154) alarm for too long pressurization time
156-setting (156) invalid flag
158-determining (158) pump timing flag status
160-determining (160) trigger timer flag status
162-sending (162) message
163-resetting and starting (163) trigger timer
164-sending (164) message and initiating corrective action

TRIGGERING SNAPSHOT READINGS FOR INTERMITTENT FLOW PIPE CONFIGURATION 210-triggering (210) snapshot for intermittent flow pipes
218-starting (218) snapshot readings
220-determining (220) 'first' flag status
221-determining and clearing (221) invalid flag
222-conditional waiting (222) one time period
223-clearing (223) invalid flag
224-determining (224) pressure/flow pump status
226-setting (226) pump timer flag
227-starting (227) pump timer
228-reading (228) receiving tank temperature from tank temperature sensor (26B)
230-determining (230) pressure/flow pump status
232-determining (232) pumping time condition
234-triggering and displaying (234) long pressurization alarm
236-reading and calculating (236) pressure and offset from pressure set point
238-determining (238) if pressure offset is less than a preselected value
240-setting (240) invalid flag
242-determining (242) pump timer flag status
244-reading (244) temperature from temperature sensors (26A, 26C . . . ) and volume from volume sensors (24A & 24B)
246-clearing (246) trigger timer flag
247-resetting and starting (247) trigger timer
248-returning (248) to parent module
250-clearing (250) trigger timer flag, pump timer flag, and no-flow timer flag
251-resetting (251) trigger timer, pump timer, and no-flow timer
252-determining (252) first pump (34A) status
254-setting (254) no-flow timer flag
255-starting (255) no-flow timer
256-clearing (256) pump timer flag
257-resetting (257) pump timer
258-determining (258) no-flow timing condition
260-setting (260) no-flow timer flag
261-starting (261) pressurization/flow pump
262-clearing (262) pump timer flag
263-resetting (263) pump timer
264-resetting and starting (264) no flow timer
266-sending (266) error message and taking corrective action

BRIEF DESCRIPTION OF THE PREFERRED EMBODIMENT

FIG. 6A is diagram showing the change in temperature over the length of a pipe.

DETAILED DESCRIPTION OF THE PREFERRED EMBODIMENT

Figure 1:
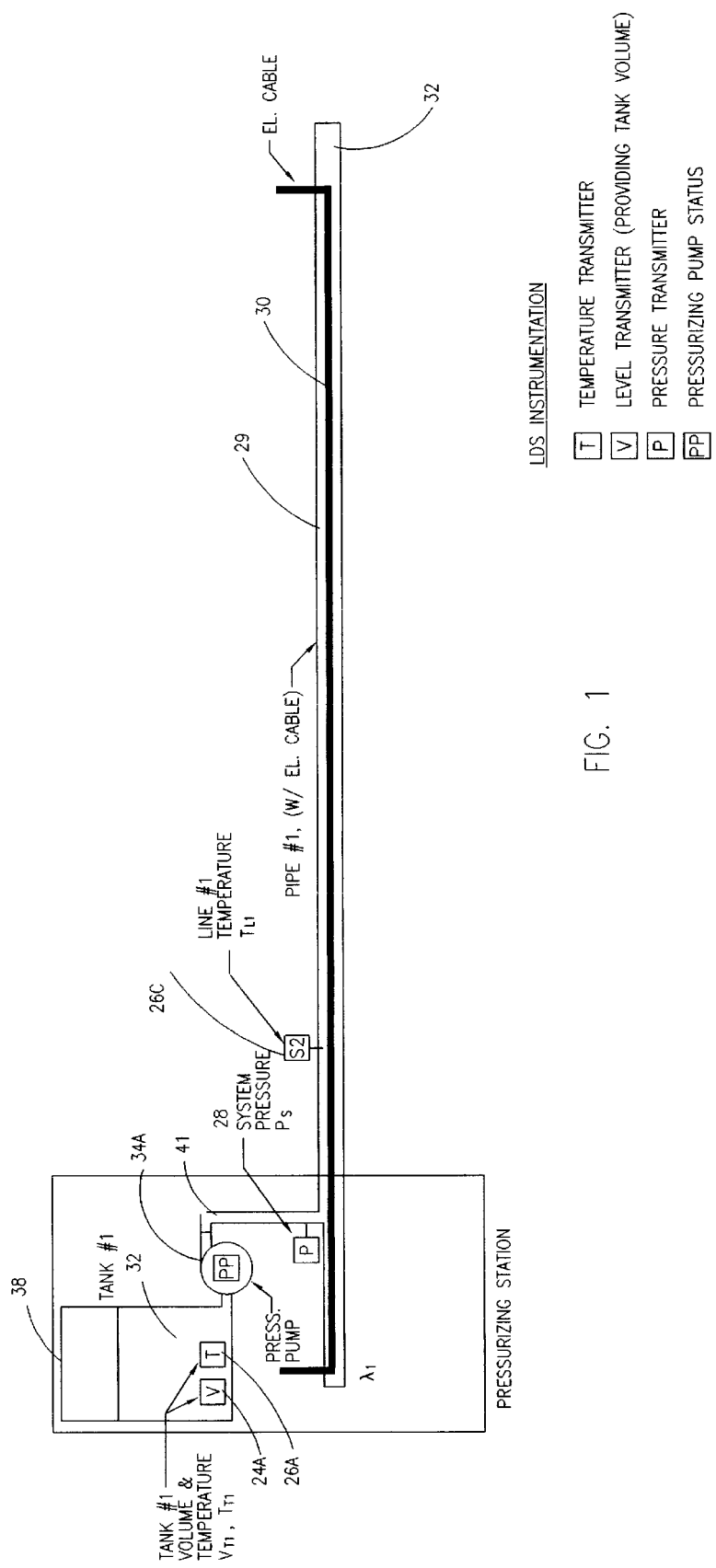
FIG. 1 shows a minimum instrumentation required for a leak detection system configured for a typical stationary pipe without circulation or flow of a fluid.

Piped-type electrical transmission cable is constructed with an electrical conductor as a center core surrounded by a non-conductive insulation, and typically laid in steel pipes filled with oil. A leak in the pipe allowing oil to escape into the surrounding environment may be a health hazard and may effect the ecology of an area proximal to the leak. Electrical utilities are sensitive to environmental impacts of the transmission lines they use to distribute electricity, including the more visible of these, an oil leak. Detection of small leaks in relation to the total volume of oil in the pipe is difficult because of an interrelationship of a number of factors not the least of these is the thermal expansion of the oil. In the past thermal expansion has been determined by creating a mathematical/thermal model of the oil, pipe, cable and soil to calculate total oil volume compensated for temperature. The precision of the oil volume calculations is dependant on the accuracy of the mathematical/thermal model. The models tend to become complex as real world variables are added, such as differential thermal characteristics of soil along the pipe path or proximity to another piped-type cable.

Ariving at the true total volume requires consideration of the relationship between the following factors:

A. The change of oil volume inside an oil tank which functions as an expansion tank for the fluid in the pipe. The expansion of the oil is proportional to the oil temperature change. The coefficient of thermal expansion of most oils used for that purpose is either 0.00037 or 0.0004 per °F., depending on the type of oil used, and it is constant over the range of temperatures that the oil is exposed to in pressurized pipes for underground power transmission systems. The temperature of oil inside the pipe is a function of the following:

The current flowing through the transmission piped-type cable which heats the conductor and in turn transmits heat to the surrounding oil.

Losses due to the flow of the oil.

The thermal properties of the transmission piped-type cable conducting metal and insulation, oil and pipe.

The thermal properties of the surrounding earth at the particular location (varies along the pipe) and the ambient temperatures of the earth surrounding the pipe.

B. The thermal change of the diameter of the electrical power transmission piped-type conductor, and the thermal change in diameter of the wall of the pipe. The thermal expansion of the piped-type cable and the pipe in underground power transmission systems is directly proportional to the temperature change of the cable and the pipe, respectively.

C. The thermal expansion of oil inside a tank which is directly proportional to the tank oil temperature change. For the purposes of short term oil leak monitoring it is a smaller range of magnitude than the other factors.

D. The pressure of the oil monitored.

The present invention simplifies the measurement and calculation by establishing a relationship not between total volume and a change in total volume; but, between a change in temperature of the oil in the oil tank(s) and the pipe, and the change in total volume. Simply put, the change in total volume is directly proportional to the changes of oil temperature measured at a single pipe location as demonstrated in the body of this invention.

Firstly referring to FIG. 1 which is a leak minimized detection system for a typical stationary first line (29) having the following features: first volume sensor (24A), first volume temperature sensor (26A), first line temperature sensor (26C), pressure sensor (28), first line (29), electrical piped-type cable (30), fluid (32), first pump (34A), and relief valve (36), and first tank (38),and pressurizing line (41).

The leak detection system comprises a first line (29) enclosing an electrical piped-type cable (30). The first line (29) is filled with a fluid (32). The first line (29) is connected on a proximal end to one distal end of a pressurizing line (41). The opposite distal end of the pressurizing line (41) is connected to a first pump (34A). The first pump (34A) functions to pressurize the pressurizing line (41) but does not cause the fluid (32) to circulate. The leak detection system further comprises a pressure sensor (28) installed in the pressurizing line (41), the pressure sensor (28) functions to measure pressure of the fluid (32). A first volume sensor (24A) measures the volume in a first tank (38). A first volume temperature sensor (26A) measures the temperature in the first tank (38). A first line temperature sensor (26C) inserted into the first line (29) at a point adjacent to electrical cable (30) functions to measure the temperature of the fluid (32).

Leak detection is accomplished by making simultaneous measurements at a preselected pressure as indicated by the pressure sensor (28) of; the liquid temperature at the first volume temperature sensor (26A); volume of the first tank (38) by the first volume sensor (24A); and finally a liquid temperature measurement at the first line temperature sensor (26C). Calculations are performed to determine a total system volume compensated for the thermal volume change of the fluid (32). This value is stored for future use.

After a preselected time period, a second simultaneous measurement is made when the system pressure as indicated by the pressure sensor (28) is the same pressure as when the first simultaneous measurement readings were taken. The new values are compensated for temperature changes and stored. The temperature compensated volume of the first simultaneous measurement is compared to the volume of the second simultaneous measurement. If the volume difference is larger than preset and dynamically adjusted dead band, a leak is detected.

Figure 2:
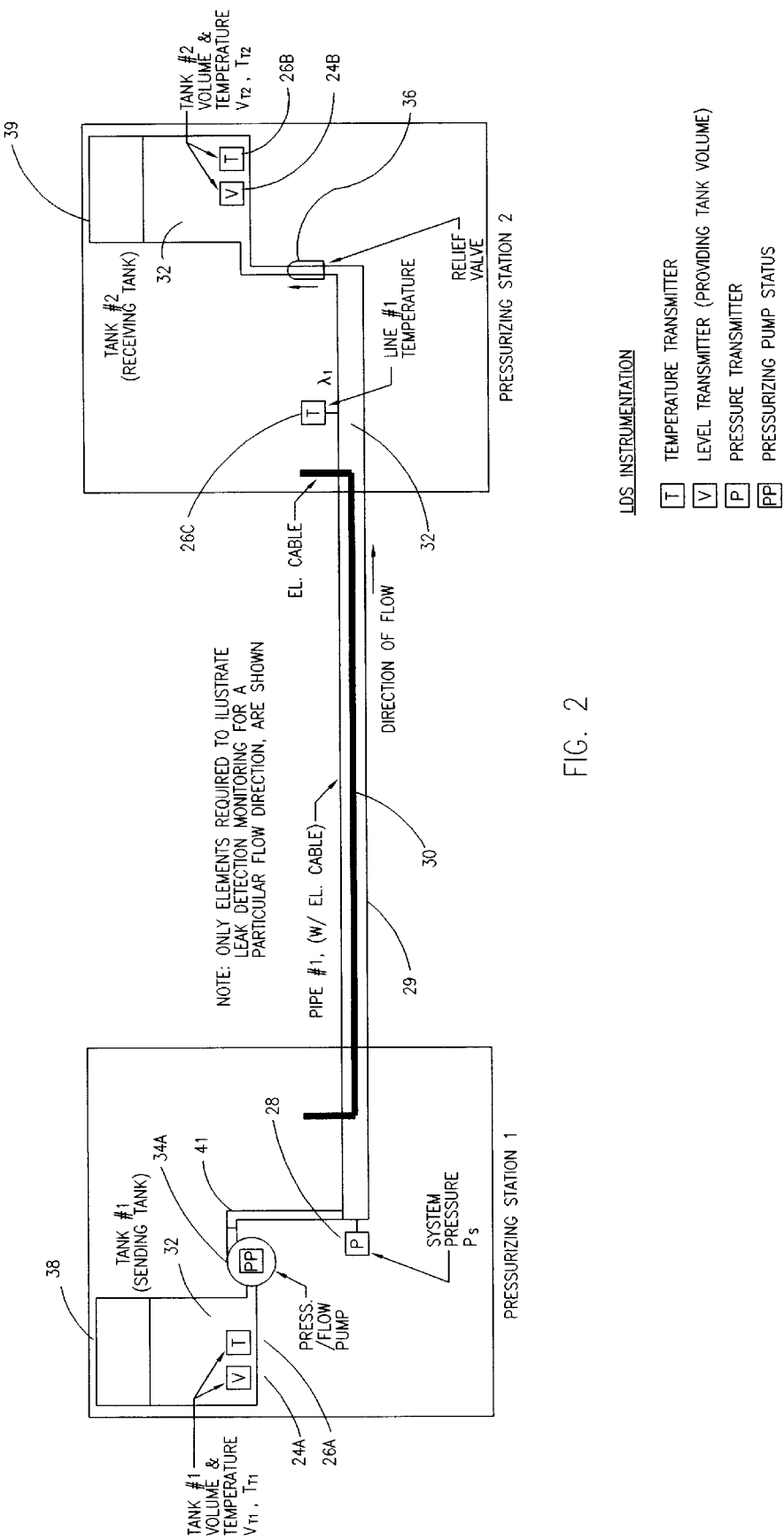
FIG. 2 shows a minimum instrumentation required for a leak detection system configured for a typical intermittent pressurization and flow pipe in which the fluid circulates therein. Only the instrumentation required for one direction of the fluid flow is shown.

Secondly referring to FIG. 2 which is a minimized leak detection system for a typical intermittent flow and pressurization first line (29) having the following features: first volume sensor (24A), second volume sensor (24B), first volume temperature sensor (26A), second volume temperature sensor (26B), first line temperature sensor (26C), pressure sensor (28), first line (29), electrical piped-type cable (30), fluid (32), first pump (34A), relief valve (36),first tank (38), second tank (39), and pressurizing line (41).

The leak detection system comprises the first line (29) enclosing an electrical piped-type cable (30). The first line (29) is filled with the fluid (32) that is pressurized by first pump (34A) through a pressurizing line (41). The leak detection system further comprises a pressure sensor (28) installed in the pressurizing line (41), the pressure sensor (28) functions to measure pressure of the fluid (32). A first volume sensor (24A) measures the volume in a first tank (38). The volume of the second tank is measured by a second volume sensor (24B). The first volume temperature sensor (26A) measures the temperature in the first tank (38). The second volume temperature sensor (26B) measures the temperature in a second tank (39). The second tank (39) functions as an overflow tank in to which fluid (32) flows when the relief valve (36) is tripped to reduce pressure in the first line (29). A first line temperature sensor (26C) inserted into the first line (29) at an exit point of the first line (29) functions to measure the temperature of the fluid (32) in the first line (29).

Leak detection is accomplished by making measurement of second volume temperature sensor (26B) at the first pump start, and simultaneous measurements when the first pump (34A) stops of, the liquid temperature at the first volume temperature sensor (26A); volume of the first tank (38) by the first volume sensor (24A); the volume of the second tank (39) by the second volume sensor (24B); and finally a liquid temperature measurement at the first line temperature sensor (26C). If the first pump (34A) does not start within the pre-set period, simultaneous measurements of all system values (including the second volume temperature sensor (26B)) is triggered Calculations are performed to determine a total system volume compensated for the change in temperature of the fluid (32). This value is stored for future use.

After a preselected time period, a second simultaneous measurement is made in the same manner, and when pressures is the same as when the first measurement readings were taken. The new values are compensated for temperature changes and stored. The temperature compensated total volume of the first simultaneous measurement is compared to the total volume of the second simultaneous measurement. If the volume difference is larger than preset and dynamically adjusted dead band, a leak is detected.

Figure 3:
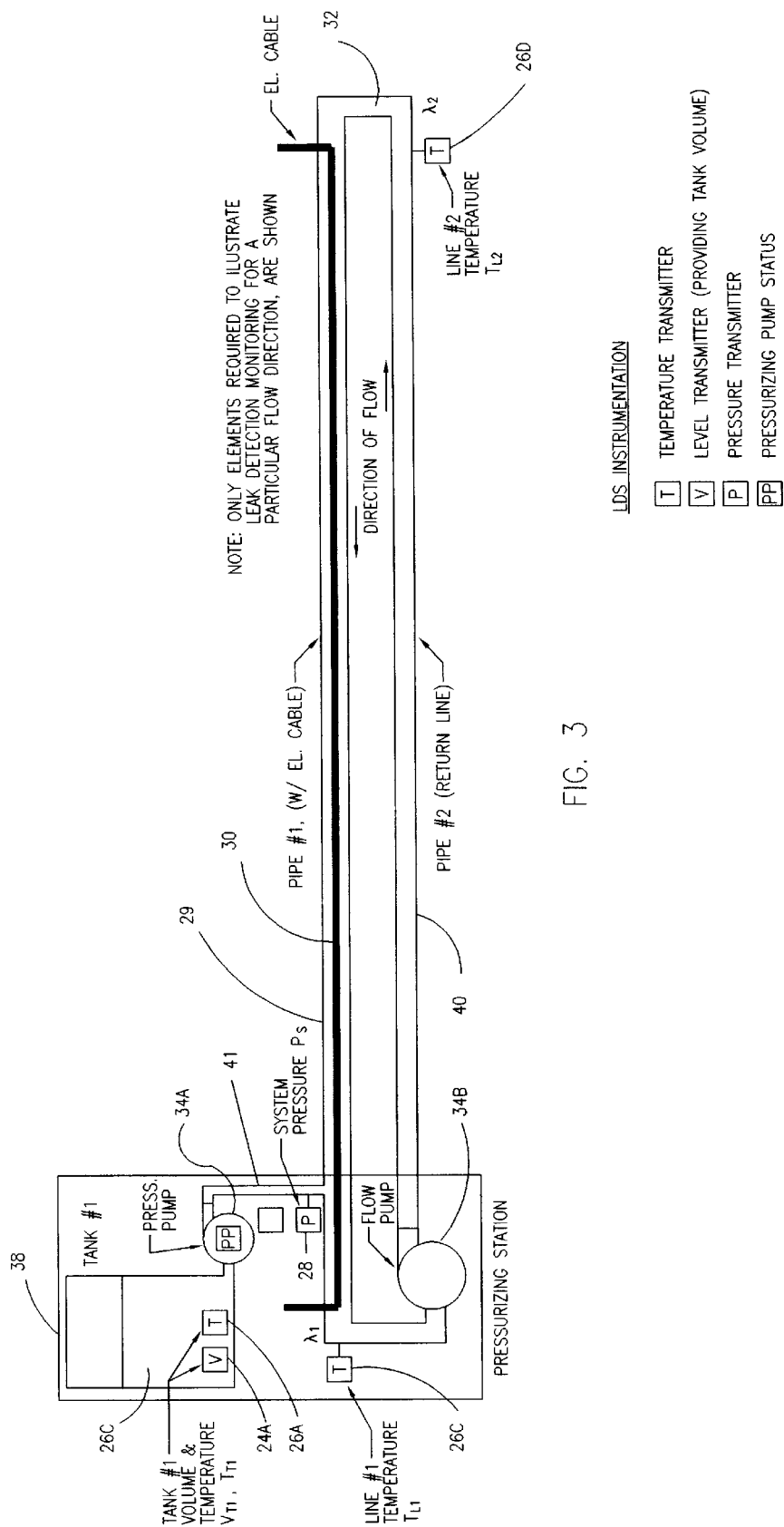
FIG. 3 shows a minimum instrumentation required for a leak detection system configured for a typical forced flow pipe in which the fluid circulates therein.

Now referring to FIG. 3 which is a leak detection system for a typical forced flow first line (29) having the following features: first volume sensor (24A), second volume sensor (24B), first volume temperature sensor (26A), second volume temperature sensor (26B), first line temperature sensor (26C), second line temperature sensor (26D), pressure sensor (28), first line (29), electrical piped-type cable (30), fluid (32), first pump (34A), second pump (34B), first tank (38), second line (40), and pressurizing line (41).

The leak detection system comprises the first line (29) enclosing an electrical piped-type cable (30). The first line (29) is filled with the fluid (32) that is pressurized by first pump (34A) through a pressurizing line (41) but does not cause the fluid (32) to circulate. The leak detection system further comprises a pressure sensor (28) installed in the pressurizing line (41), the pressure sensor (28) functions to measure pressure of the fluid (32). A first volume sensor (24A) measures the volume in a first tank (38).

The first line (29) is connected on one distal end to one distal end of the pressurizing line (41). The opposite distal end of the pressurizing line (41) is connected to the output of the first pump (34A). The opposite distal end of the first line (29) is connected to one distal end of a second line (40). The opposite distal end of the second line (40) is connected to the output of a second pump (34B). The input on the second pump (34B) is connected to the proximal end of the first line (29). The second pump (34B) functions to circulate the oil.

The first volume temperature sensor (26A) measures the temperature in the first tank (38). A first line temperature sensor (26C) inserted into the first line (29) at an exit point of the first line (29) functions to measure the temperature of the fluid (32). A second line temperature sensor (26D) is inserted into the first line (29) at a distal end from the first line temperature sensor (26C). The second pump (34B) is inserted into the first line (29) to circulate the flow therein.

Leak detection is accomplished by making simultaneous measurements at a preselected pressure as indicated by the pressure sensor (28) of; the liquid temperature at the first volume temperature sensor (26A); volume of the first tank (38) by the first volume sensor (24A); a liquid temperature measurement at the second line temperature sensor (26D); and finally a liquid temperature measurement at the first line temperature sensor (26C). Calculations are performed to determine a total system volume compensated for the change in temperature of the fluid (32). This value is stored for future use.

After a preselected time period, a second simultaneous measurement is made when the system pressure as indicated by the pressure sensor (28) is the same pressure as when the first simultaneous measurement readings were taken. The new values are compensated for temperature changes and store. The temperature compensated total volume of the first simultaneous measurement is compared to the total volume of the second simultaneous measurement. If the volume difference is larger than preset and dynamically adjusted dead band, a leak is detected.

While simplified hydraulic system configurations are shown on FIG. 1, 2, and 3 the leak detection system can be applied to system such as fluid pipe systems installed underground and underwater having with occasional fluid flow; fluid pipe systems installed underground and underwater having forced cooling, and fluid pipe systems installed underground and underwater having no fluid circulation.

Figure 4:
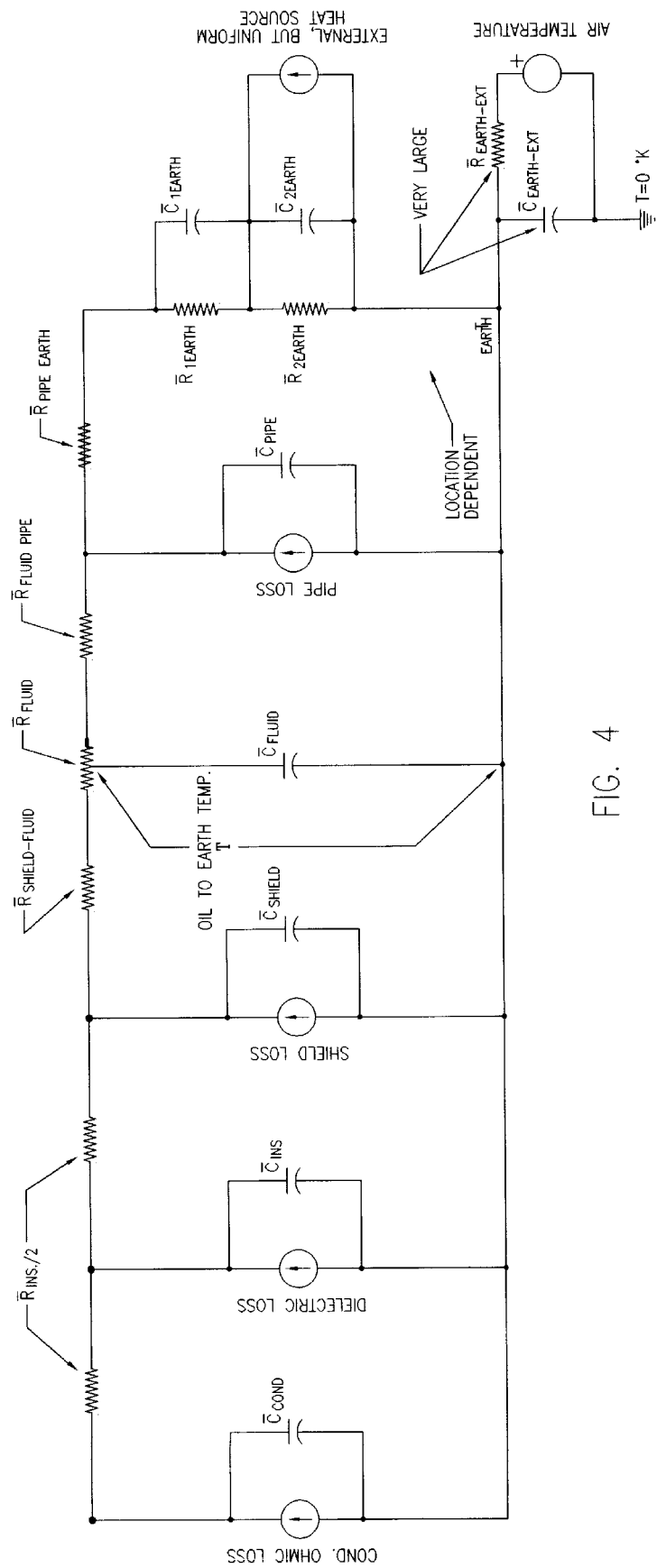
FIG. 4 is a schematic diagram of a underground cable thermal circuit.
Figure 5:
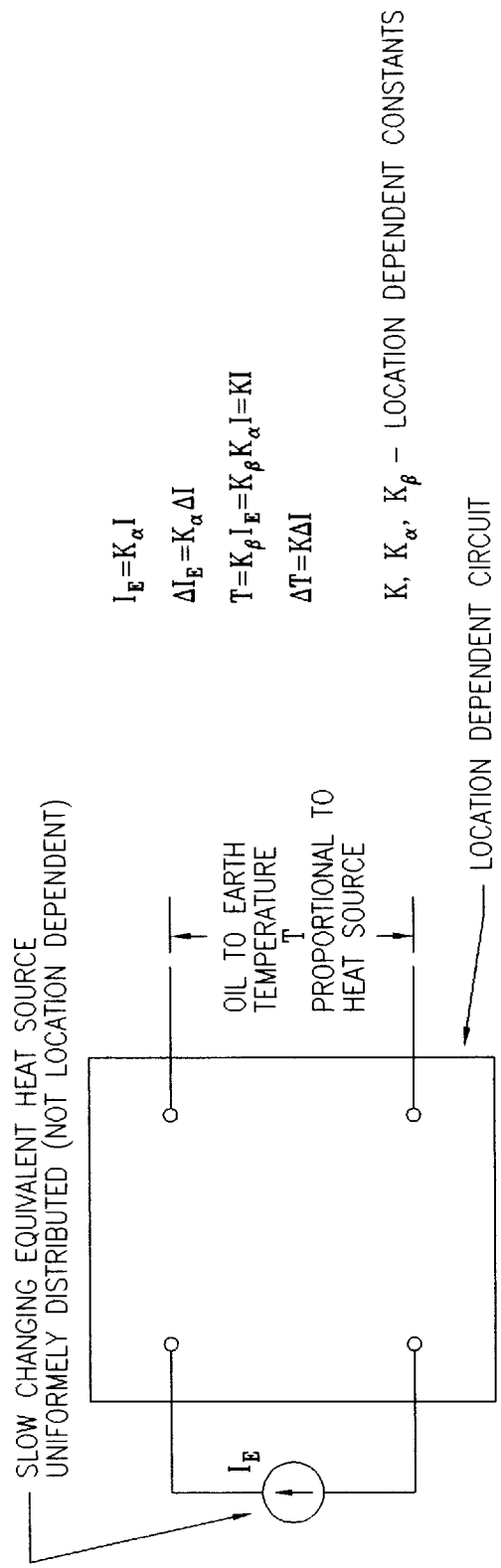
FIG. 5 is a Thevenin Equivalent of thermal circuit shown in FIG. 4.

Now referring to FIG. 4 and FIG. 5 which is an electrical equivalent circuit modeling underground transmission line heat transfer at particular location. The transformed circuit, with the branch representing the oil temperature separated from the rest of the circuit in accordance with Thevenin's theorem, is shown on FIG. 5. According to the same theorem, the voltage (oil temperature) sensed at the end of pulled-out branch, at any location, will be proportional to the Thevenin source of power (current, flow loss, adjacent power line, . . . ). The following conclusions cold be made:

Change of temperature of oil exiting the pipe is proportional to the local change of heating affecting the pipe, regardless of it's source.

Change of temperature of oil at any location inside the pipe is proportional to the local change of heating affecting the pipe, regardless of it's source.

Both the piped-type cable and the pipe local temperature changes, as components in the electrical equivalent of the thermal circuit, are subject to the same Thevenin electrical circuit transformation allowing us to derive the same conclusion—that they are also proportional to the local heat source(s) changes. However, when the following conditions (as it is the case with underground transmission lines) are met:

1. The thermal coefficient of a liquid to be monitored for leaks is a constant over the range of temperatures the liquid is typically exposed to.

2. The major source of heating or cooling of a liquid is uniform along each in the system, or can be easily monitored and mathematically pipe modeled in order to include it's effects to the liquid volume in the system. It is not necessary for temperature along the pipe line to be uniform.

3. A single pipe, or a small group of pipes, with their associated tanks can be hydraulically isolated, to allow for calibration tests of the new LDS (to establish the constant $\lambda = \Delta V / \Delta T$ for each pipe).

4. It is possible to measure the volume of the liquid in the reservoirs (tanks or containers), excluding the pipes, with the accuracy larger than the one acceptable for actual leak detection, and it is possible to measure the liquid temperature at the exit of each pipe where the liquid flows (both pipe ends if flow is possible in both directions), or at the location adjacent to the major heat source inside each pipe with stationary liquid.

5. If the system is pressurized, it is possible to take each set of system parameters readings, required for the new LDS, at the same constant system pressure. Atmospheric pressure deviations do not affect the new LDS performance. The only location-dependant elements of the thermal circuit (FIG. 4 and FIG. 5) are thermal resistivity of pipe-earth connection and thermal resistivity and capacitance of the earth, and to a much smaller extent, the ambient temperature. Since the Thevenin source of power is not location-dependant, and since any change in the Thevenin's power source output will cause the proportional, but location specific, change in the output voltage (oil temperature change), all output voltages (oil temperature changes) will be, if not the same, proportional among themselves, and also to the temperature change detected at the oil exiting the pipe. Therefore, the final conclusions can be derived:

Change of temperature of oil at any location inside the pipe is proportional to the change of temperature of oil exiting the pipe.

Total change of volume of oil inside the pipe is linearly proportional to the change of temperature of oil exiting the pipe.

Excess of oil volume detected outside of the pipe is proportional to the change of temperature of oil exiting the pipe.

Although the Thevenin theorem stands for both AC and DC circuits, it is true that different rates of temperature change do result in different ratios between the changes of the output voltages of the Thevenin's transformed circuit (oil temperature changes at different locations). This means that while the above proof reasonably stands for system with slow temperature changes (capacitances in the thermal circuit can be neglected), the only location dependant AC element in the circuit—thermal capacitance of the earth—may introduce temporary system inaccuracies during the periods of fast temperature changes. However, the magnitude of such instability is proportional to the easily monitored rate of oil temperature change, and has been accounted for.

In addition, the fact that negative leg of the thermal circuit represents the local earth temperature, may result in a relatively small seasonal deviation between the detected and expected volume levels. The wavelength of the deviation will be one year. It's magnitude will be proportional only to the ratio between the temperature changes sensed at the single pipe location and the (unknown) average oil temperature changes along the pipe. (If they happen to be the same, the magnitude of seasonal deviation will be zero). Since the change is much slower than the sampling frequency it will not affect any short term leak detection.

For example: suppose that the electrical current increase (and/or flow increase, and/or adjacent power line current increase) caused 2° F. temperature increase, detected at the oil exiting the pipe. Let us also suppose that, at the same time but because of the different local soil conditions, at some other location along the line the oil temperature increase was 3° F. Then, if at a later time the 3° F. temperature increase of the oil exiting the pipe is detected, we will know, without actually being able to measure it, that at the same particular location inside the pipe the oil temperature increase is 4.5° F.

Now referring to FIG. 6A which is a diagram showing the change in temperature over the length of the first line (29). The average temperature change along the line, as a measure for the line oil volume change, can be calculated with formula:

$$\Delta V = \frac{\int \Delta T * dL}{L}$$

(where L is underground pipe length and $\Delta T$ is local temperature change)
Graphically, it is the area (shaded) between the two temperature curves shown divided by the length of the underground line. This means that the shaded area itself (since the length of the line is a constant) is a measure of the thermal expansion of the oil inside the pipe, and that the temperature change detected at the oil exiting the pipe is also a measure of the thermal expansion of the oil inside the pipe.

Figure 6B:
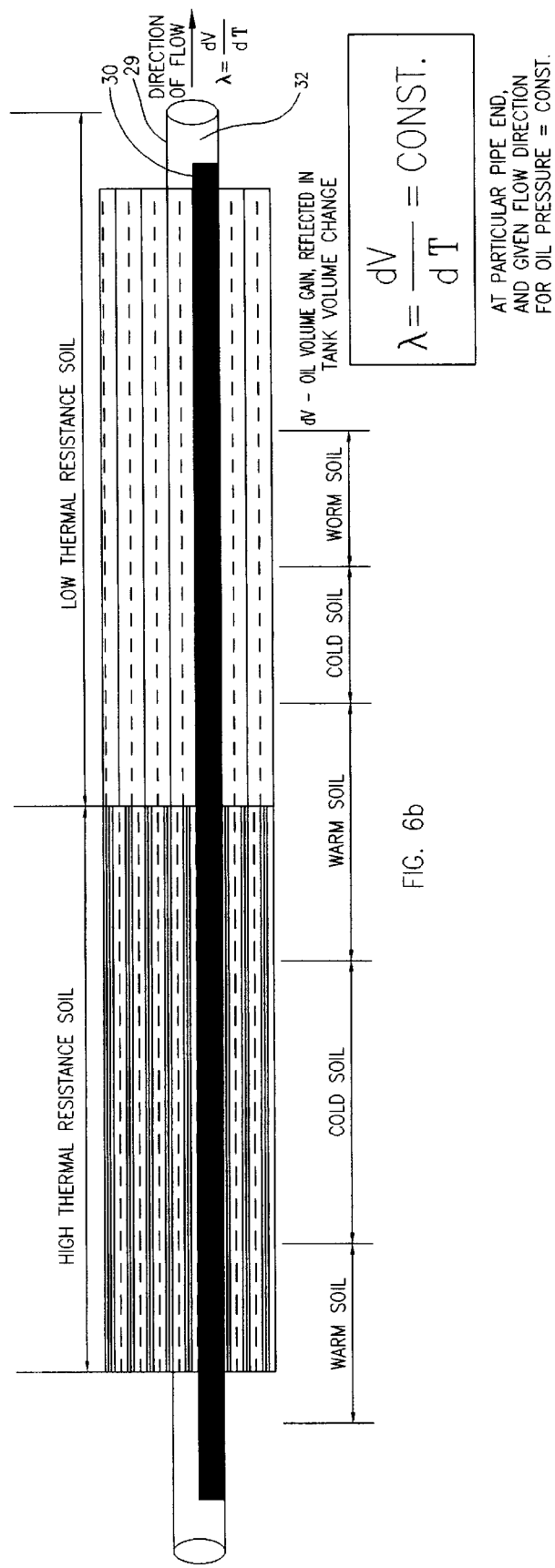
FIG. 6B is showing a diagram of a first line (29), electrical cable (30), fluid (32) in various soil types.

Referring now to FIG. 6B which shows a first line (29), electrical piped-type cable (30), fluid (32) in various soil thermal condition that might be encountered along a typical route. Implementation of any leak detection means must consider a number of practical considerations. Each oil-filled underground piped-type cable pipe will provide a fixed extra volume to the pressurized oil system per each °F. of temperature change—a constant $\lambda = \Delta V/\Delta T [Gal/°F.]$. That constant should be established for each pipe in the system. A term pipe, for this application, should be defined as an underground oil-filled pipe, with or without electrical transmission line, for which the previously defined assumptions are reasonably satisfied.

In order to properly establish $\lambda$ for a single pipe, it is necessary to perform (direct or indirect) readings of the temperature of oil inside the pipe, tank oil volume(s) and tank oil temperature(s). Oil volumes inside the tank should always be adjusted to the "normalized" temperature, before any comparison with the previous readings takes place. Additional data should be gathered in the following manner:

If a single pipe with it's associated oil tank(s) can be hydraulically (temporarily) isolated, the two (2) oil temperature measurements must be taken under the most similar conditions (pressure=const.). They should read temperature difference of several °F. The temperature read must also reflect the temperature of the oil inside the pipe that has contact with the electrical piped-type cable. The above conditions can be satisfied for pressurized oil pipes with forced oil circulation, by measuring the temperature of the oil exiting the pipe in the predefined time intervals, provided that the oil pressure has the same value at each measurement, for pressurized oil pipes with slow oil circulation, and with the intermediate pressurization pump starts, by measuring the temperature of the oil exiting the pipe, at times when the pressurizing pump at the opposite end of the pipe stops. Receiving tank oil temperature readings should be read at the times when the pressurization pump starts (to allow the more accurate reading of the oil temperature), while the tank oil volume and sending tank oil temperature readings should be taken at the same time as the oil exiting the pipe temperature—at each pump stop.

for pressurized oil pipes with no oil circulation other than a very small circulation at the pressurization end and at the time of pressurization, the oil temperature should be measured at a single point inside the pipe, provided that electrical piped-type cable is present at that point. According to the Thevenin's theorem, the temperature change measured in this manner will be linearly proportional to the thermal expansion of the oil inside such stationary pipe, shown at the excess oil tank volume. Each temperature reading should be triggered when the pressurization pump is running, and when a certain oil pressure level is reached (one reading per pump run, under the same pressure conditions).

If a single pipe can not be hydraulically isolated with it's associated oil tank(s) in order to establish a particular $\lambda[Gal/F]$ constant for that pipe
(due to the operation conditions of an existing pressurization system), $\lambda$ can be established for n pipes by taking n+1 readings of tank oil volumes and n+1 readings of each pipe oil temperatures, and then by solving the system of n equations with n unknowns, in the form:

$$\lambda_1 \Delta T_{11} + \lambda_2 \Delta T_{12} + \ldots + \lambda_n \Delta T_{1n} + \ldots = \Delta V_1$$

$$\lambda_1 \Delta T_{12} + \lambda_2 \Delta T_{22} + \ldots + \lambda_n \Delta T_{2n} + \ldots = \Delta V_2 \ldots$$

$$\lambda_1 \Delta T_{1n} + \lambda_2 \Delta T_{2n} + \ldots + \lambda_n \Delta T_{nn} + \ldots = \Delta V_n$$

where,
$\lambda_1, \lambda_2, \ldots \lambda_n$ is $\lambda$ constant [Gal/°F.] for pipe 1, 2, ... n; $\Delta T$, is the oil temperature difference at exit of pipe I, between the 1st and k+1 measurement; and $\Delta V_k$ is the total tank(s) oil volume difference, between the first and k+1 measurement;

In order to obtain the meaningful results, pressure of oil inside the piping system should be same for all the readings. In addition, first n+1 readings (necessary for each pipe's $\lambda$ calculation) should take place when the biggest overall temperature change of oil in the system is expected, in order to minimize errors due to instrumentation inaccuracy. The bigger pipe oil temperature change is sensed during the initial calculation of each pipe's λ calculation, the more accurate results will be. The reasonable attempt should be made to minimize the number of pipes for which λ constant has to be established. Whenever possible, λ should be established for one pipe at the time. The initial (for a single pipe) instrumentation inaccuracy increases by the factor K when $\lambda_1, \lambda_2, \ldots \lambda_n$, for n pipes is calculated by taking n+1 readings over the same range of oil temperature change.

When the temperature of pipe oil is affected by a concentrated heat source or heat sink (not a uniform heat source/sink along the pipe line, e.g., in case of forced cooling of the circulating oil where oil passes the cooling plant), as long as such heat source or sink can be considered to be outside of the pipe monitored, and does not introduce fast change of it's output oil temperature, it will in no way affect this oil leak detection system. When sudden output oil temperature change takes place (starting or stopping of cooling plant operation), a disturbance will be introduced to the system, in form of small rate of oil volume gain or loss, that can not be sensed instantaneously as the temperature of oil exiting the pipe(s). In such situations, this system should recognize the fact that there was a disturbance introduced, and shall temporarily extend it's margin of error (reduce sensitivity), until the system with a new temperature differential at the ends of the concentrated heat source or sink stabilizes through the pipe(s). In addition, the rough mathematical modeling (in form of exponentially decreasing gain or loss rate) can be applied to the total adjusted volume calculation, as:

$$\gamma * \Phi * \Delta Td * (1 - e^{-t/\tau})/60$$

where $\gamma$ is coefficient of oil thermal expansion, (0.00037 or 0.0004 1/°F., depending on the type of oil used), $\Phi$ is the oil flow [Gal/min], $\Delta Td$ is change of the oil temperature differential in °F., e is a the natural logarithm constant (2.71 . . . ), t is elapsed time since temperature differential change, in sec, and $\tau$ is a pipe time constant to be determined on per case basis.

Figure 7A:
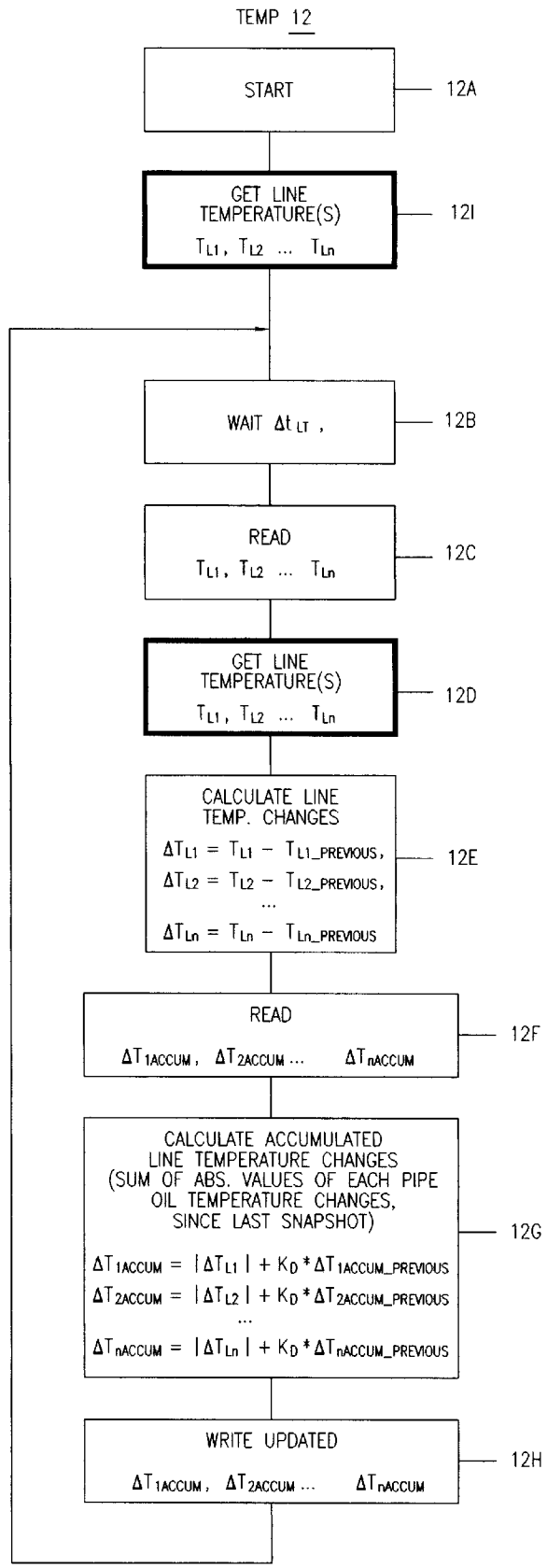
FIG. 7A is a flow diagram showing pipe temperature.

Now referring to FIG. 7A which is a flow diagram showing a continuous line temperature monitoring (12) having the following features: starting (12A) line temperature monitoring, waiting (12B) a time period, retrieving (12C) last recorded temperatures, reading and storing (12D) current line temperatures from temperature sensor (26C . . . ), calculating and storing (12E) temperature changes, reading (12F) last recorded accumulated temperature changes, calculating (12G) new accumulated line temperature changes, updating (12H) new accumulated line temperature changes and reading and storing (12I) current line temperatures from temperature sensor (26C . . . ).

The leak detection system comprises a temperature line temperature monitoring (12). Starting (12A) line temperature monitoring measurements are taken as soon as the set-up data is entered resulting in reading and storing (12I) current line temperatures from temperature sensor (26C . . . ). After awaiting (12B) a time period, $\Delta t_{LT}$ (typically 10–30 sec), then retrieving (12C) last recorded temperatures, reading and storing (12D) current line temperatures from temperature sensor (26C . . . ) at each monitored pipe, and then calculating and storing (12E) temperature changes results in new temperature changes being stored. Reading (12F) last recorded accumulated temperature changes results calculating (12G) and updating (12H) new accumulated line temperature changes. The calculating (12G) new accumulated line temperature changes operation takes into account system dynamics, and assigns a weighting factor based on the chronological order of the values obtained from calculating and storing (12E) temperature changes. The line temperature monitoring (12) is done on a continuous basis so that the values are always ready for use when called.

Figure 7B:
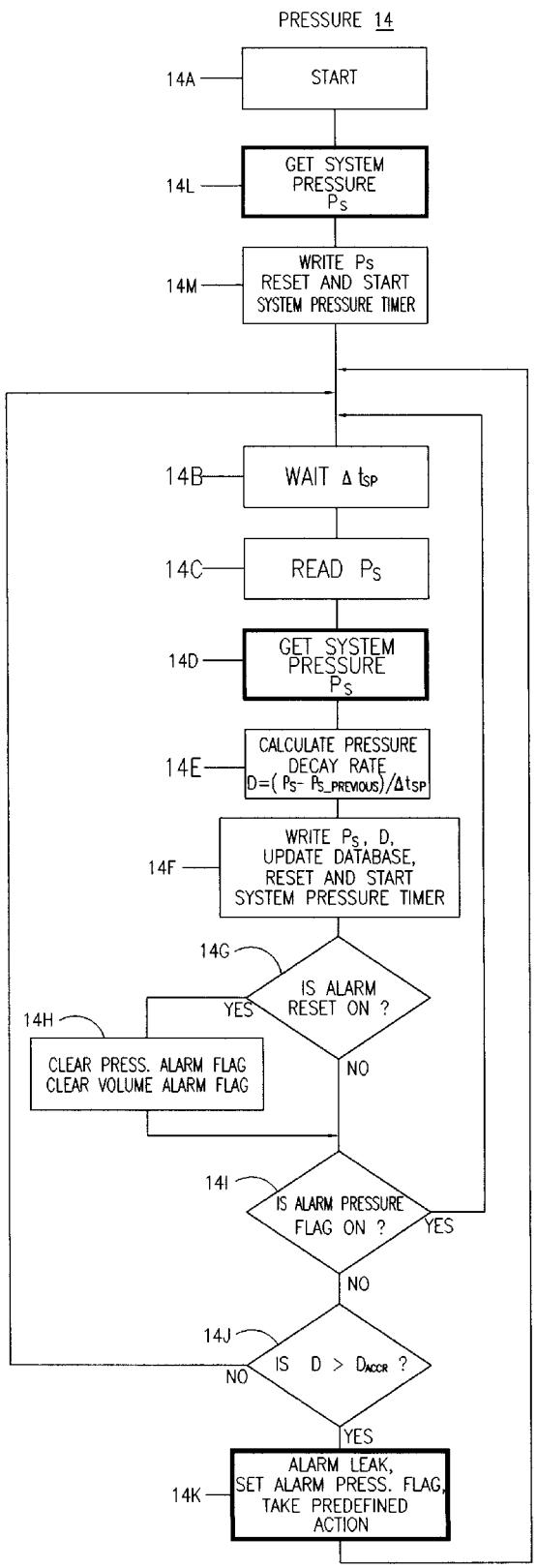
FIG. 7B is a flow diagram showing pressure monitoring/pressure decay detection operation.

Now referring to FIG. 7B which is a flow diagram showing pressure and pressure decay monitoring (14) having the following features: pressure and pressure decay monitoring (14), starting (14A) pressure and pressure decay monitoring, waiting (14B) time period, retrieving (14C) last recorded pressure, reading (14D) current pressure from pressure sensor (28), calculating (14E) pressure decay rate, storing (14F) pressure and pressure decay rate, reset and start system pressure timer, testing (14G) alarm reset, clearing (14H) pressure alarm flag and volume alarm flag, determining (14I) if alarm pressure flag is set, determining (14J) if pressure decay is greater than preselected value, tripping (14K) alarm function, reading (14L) current pressure from pressure sensor (28) and storing (14M) pressure, reset and start system pressure timer.

The leak detection system comprises a pressure and pressure decay monitoring (14). Starting (14A) pressure and pressure decay monitoring as soon as the set-up data is entered resulting in reading (14L) current pressure from pressure sensor (28) then storing (14M) pressure reset and start system pressure timer, a waiting (14B) time period $\Delta t_{SP}$, (typically 1 sec), results in retrieving (14C) last recorded pressure, anew reading (14D) current pressure from pressure sensor (28), and calculating (14E) pressure decay rate. Storing (14F) pressure and pressure decay rate, reset and start system pressure timer results in testing (14G) alarm reset if it is set then clearing (14H) pressure alarm flag and volume alarm flag. Determining (14I) if alarm pressure flag is set results in program returning to waiting (14B) time period if it is set, or otherwise in determining (14J) if pressure decay is smaller than preselected value, if so then tripping (14K) alarm function trips the alarm and sets the alarm pressure flag before the program returns to waiting (14B) time period. If not, then the program directly returns to waiting (14B) time period.

The pressure and pressure decay monitoring (14) functions to continuously read and store pressure measurements from the pressure sensor (28), and to alarm on hi pressure decay rates.

Figure 8A:
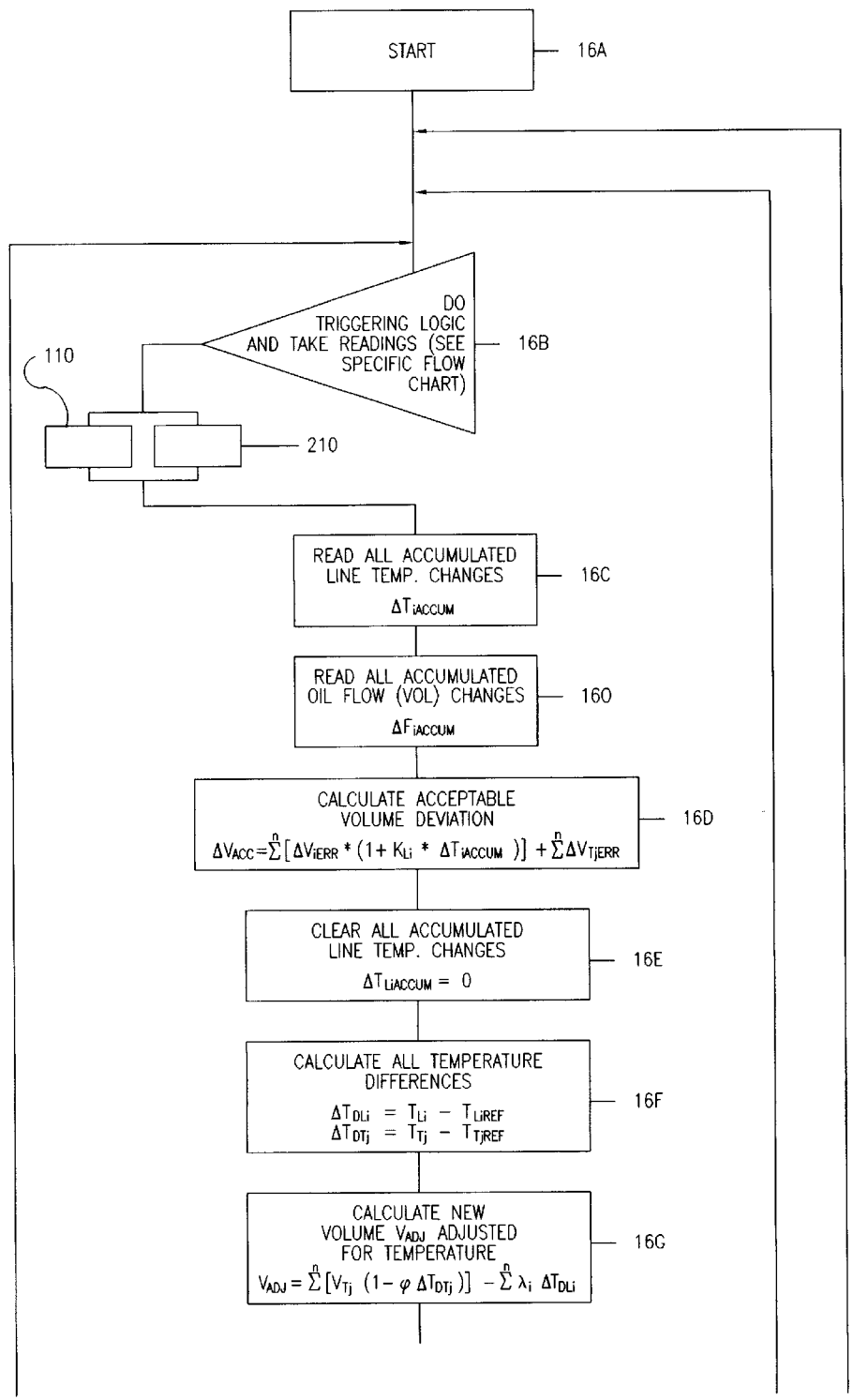
FIG. 8 is a flow diagram showing snapshot volume calculations—volume comparison leak detection operation.
Figure 8B:
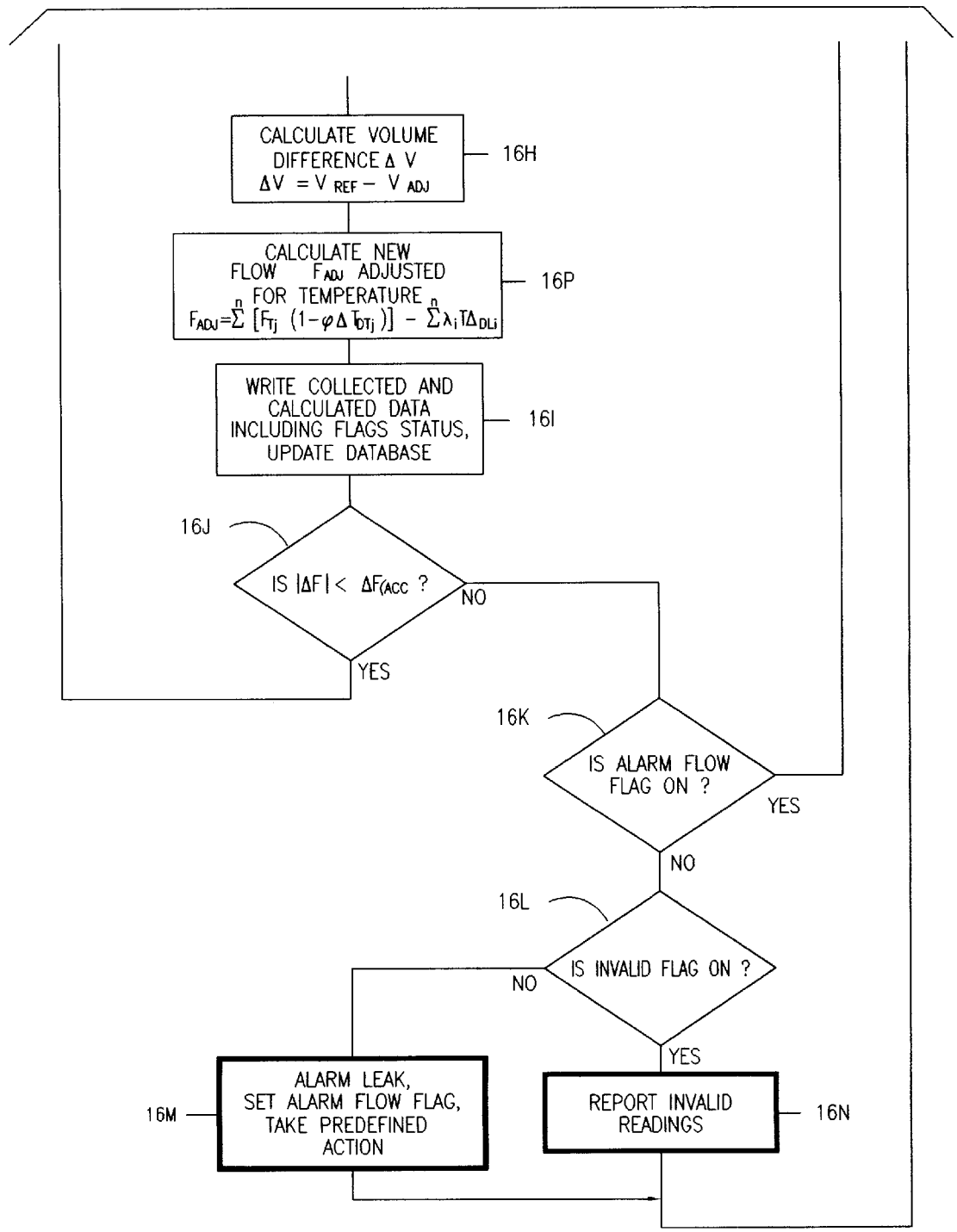

Now referring to FIG. 8 which is a flow diagram showing snap shot volume calculations (16) having the following features: starting (16A) volume calculation, executing (16B) triggering logic , reading (16C) accumulated line temperature changes, calculating (16D) acceptable volume deviation, clearing (16E) accumulated line temperature changes, calculating (16F) temperature differences, calculating (16G) volume adjusted for temperature, calculating (16H) volume difference, writing (16I) collected and calculated data including flags, determining (16J) if volume change is smaller than a currently acceptable value, determining (16K) alarm flag status, determining (16L) invalid flag status, tripping (16M) alarm function, and reporting (16N) invalid readings.

A snap shot volume calculations (16) comprises starting (16A) volume calculations then executing (16B) triggering logic results in, depending on system configuration, triggering snapshot for forced flow and stationary pipes (110), or in triggering (210) snapshot for intermittent flow pipes, and in volume and temperature readings from volume and temperature sensors (24A, 24B, 26A, 26B, 26C, . . . ). Reading (16C) accumulated line temperature changes results in calculating (16D) acceptable volume deviation which determines an acceptable range of values for the new volume adjusted for the temperature. Clearing (16E) accumulated line temperature changes resets the accumulated stored line temperature changes previously calculated. Calculating (16F) temperature differences from referenced values determines the new temperature differences. Calculating (16G) volume adjusted for temperature determines the new expected volume of fluid (32) in tank(s) only. Calculating (16H) volume difference determines the offset from reference volume. Writing (16I) collected and calculated data including flags stores the new values. Determining (16J) if volume change is smaller than a currently acceptable value determines if the new volume change is less than an acceptable value. If it is the program returns to the beginning. The new volume change greater than an acceptable value results in determining (16K) alarm flag status, if the volume alarm flag is already on the program returns to the beginning. If the volume alarm flag is off then determining (16L) invalid flag status checks to see if the alarm invalid flag is on, if so then reporting (16N) invalid readings results in reports being generated and stores the invalid readings. If the invalid flag alarm is not set then results in tripping (16M) alarm function which causes the alarm to be tripped.

Figure 9A:
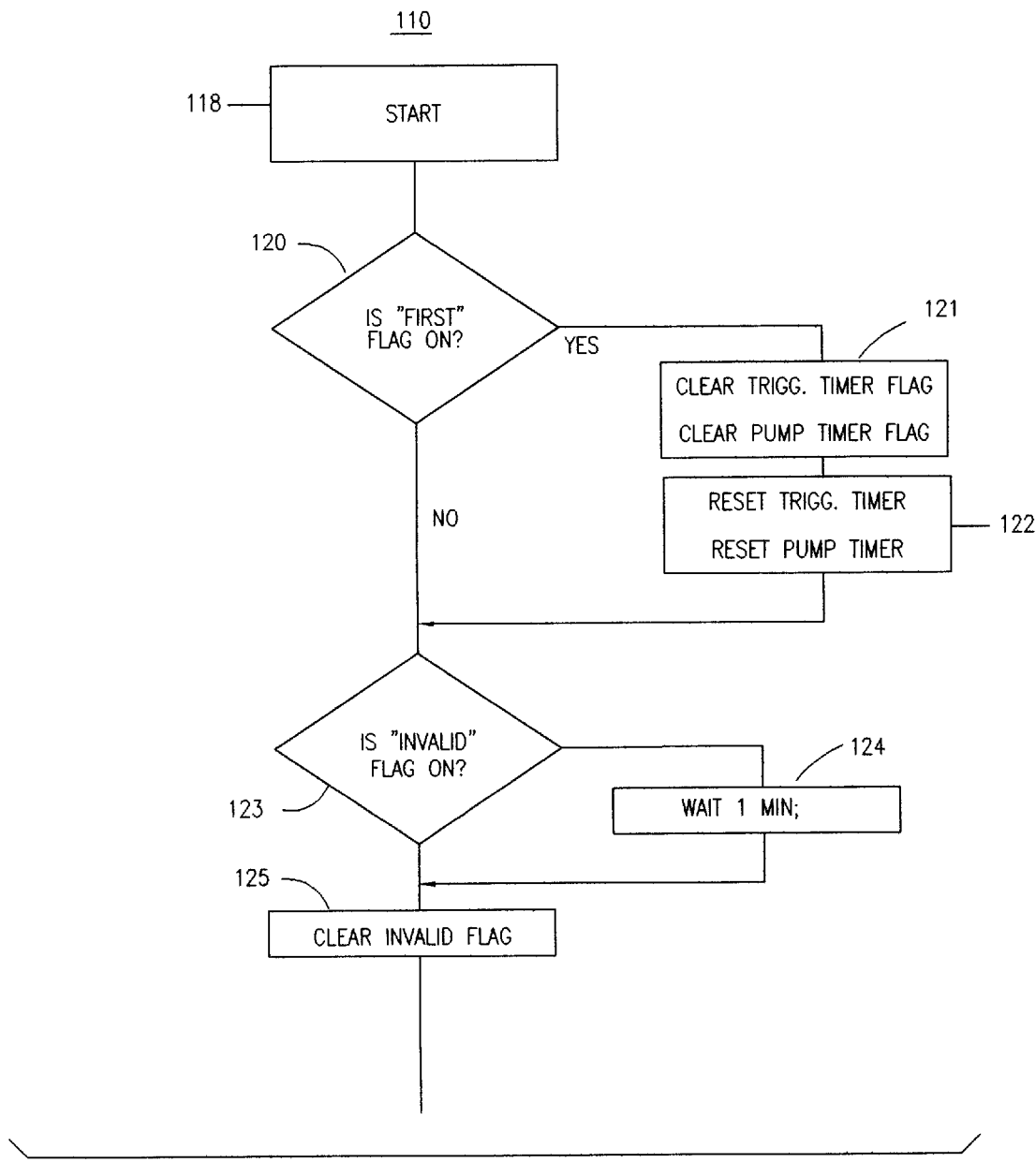
FIG. 9 is a flow diagram showing triggering snapshot for forced flow and stationary pipes.
Figure 9B:
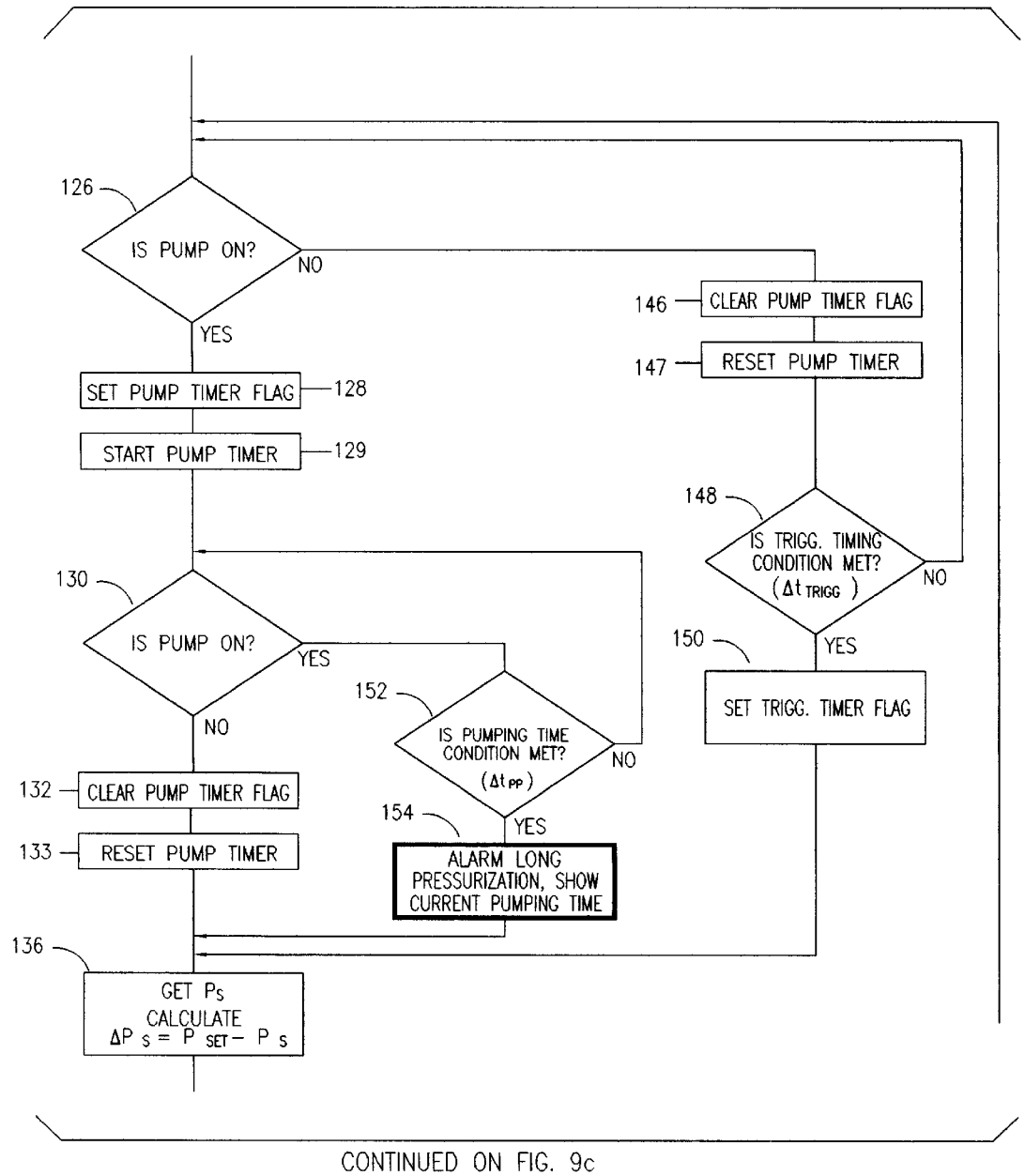
Figure 9C:
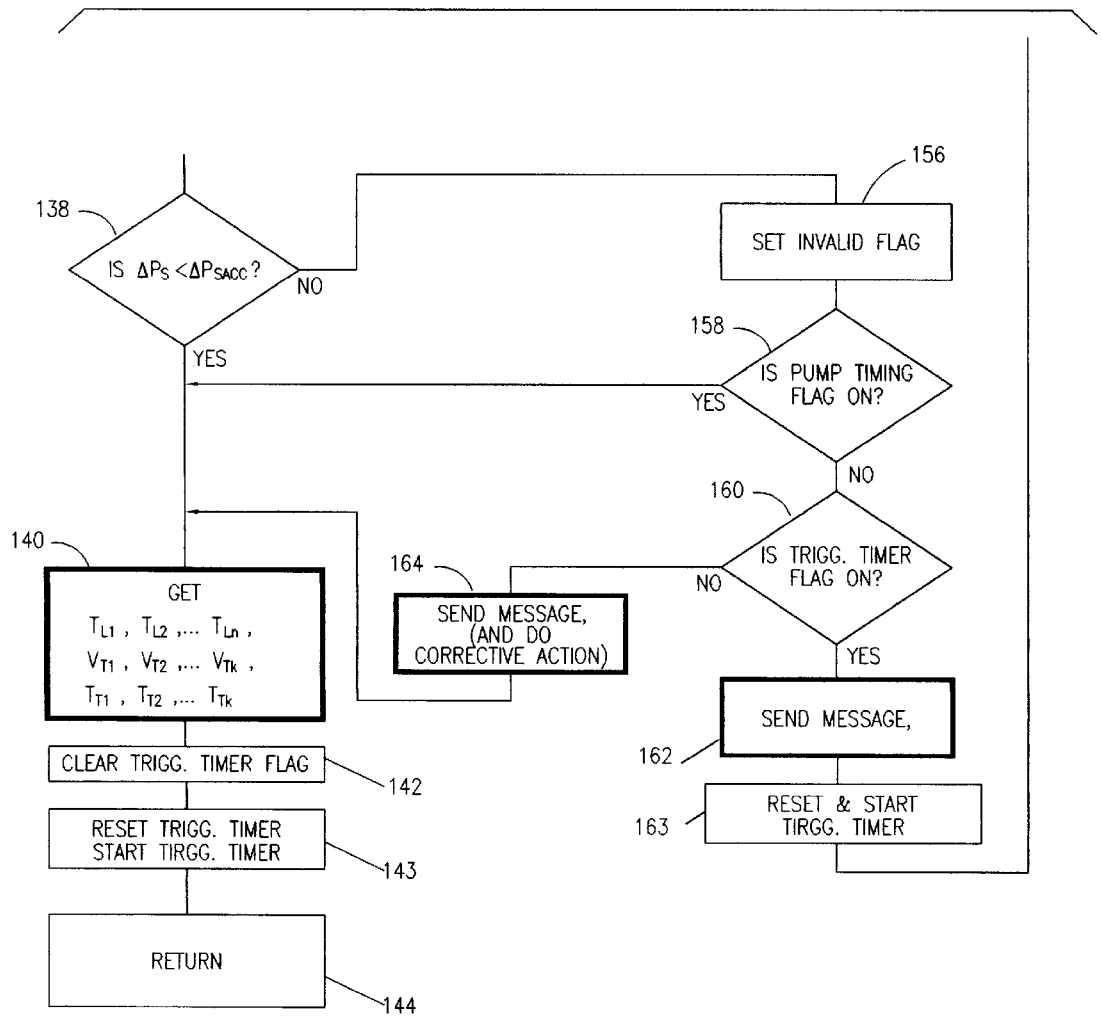

The snap shot volume calculations (16) functions to determine if the new volume, corrected for temperature, is within the dynamically adjusted acceptable dead band. If not, a leak alarm is indicated Now referring to FIG. 9 which is a flow diagram of triggering snapshot for forced flow and stationary pipes (110) having the following features: triggering snapshot for forced flow and stationary pipes (110), starting (118) snapshot readings, testing (120) first flag, clearing (121) trigger timer flag and pump timer flag, resetting (122) trigger timer and pump timer, determining and clearing (123) invalid flag, conditional waiting (124) one time period clearing (125) invalid flag, testing (126) first pump (34A) status, setting (128) pump timer flag, starting (129) pump timer, testing (130) first pump (34A) status, clearing (132) pump timer flag, resetting (133) pump timer, reading and calculating (136) pressure and offset from pressure set point, determining (138) if pressure offset is less than a preselected value, reading (140) temperature from temperature sensor (26A, 26B, 26C, 26D) and volume from volume sensors (24A & 24B), clearing (142) trigger timer flag, resetting and starting (143) trigger timer, returning (144) to parent module, clearing (146) pump timer flag, resetting (147) pump timer, determining (148) trigger timer status, setting (150) trigger timer flag, determining (152) pump timing condition, tripping (154) alarm for too long pressurization time, setting (156) invalid flag, determining (158) pump timing flag status, determining (160) trigger timer flag status, sending (162) message, resetting and starting (163) trigger timer, and sending (164) message and initiating corrective action.

Triggering snapshot for forced flow and stationary pipes (110) comprises starting (118) snapshot readings which is initiated by the snap shot volume calculations (16) or gathering (20) calibration data. Testing (120) 'first' flag functions to identify a first time through the calculations. If it is, then clearing (121) trigger timer flag and pump timer flag, and resetting (122) trigger timer and pump timer occurs before proceeding with determining and clearing (123) invalid flag and conditional waiting (124) one time period clearing (125) invalid flag, and testing (126) first pump (34A) status which determines if the first pump (34A) is already running.

If the pump is not on then clearing (146) pump timer flag and resetting (147) pump timer occurs. Determining (148) trigger timer status determines if triggering conditions are met, if so setting (150) trigger timer flag results in the trigger timer flag being set, if the trigger conditions are not met the program returns to testing (126) first pump (34A) status. The testing (126) first pump (34A) status and the determining (148) trigger timer status are the only exits from the loop.

If testing (126) first pump (34A) status determines that the first pump (34A) is on, setting (128) pump timer flag and starting (129) pump timer occurs. The next testing (130) first pump (34A) status checks if the pressurization pump is on, waiting for the pump to stop, or pumping timer to be activated, if pump stops clearing (132) pump timer flag and resetting (133) pump timer occurs. If pump is running and determining (152) pump timing condition results in tripping (154) alarm for too long pressurization time, the program returns to a reading and calculating (136) pressure and offset from pressure set point.

After the clearing (132) pump timer flag and resetting (133) pump timer occurs, reading and calculating (136) pressure and offset from pressure set point reads the pressure at the pressure sensor (28) and calculates the pressure offset. If determining (138) if pressure offset is less than a preselected value results show the change in pressure is less than a preselected value then reading (140) temperature from temperature sensor (26A, 26B, 26C, 26D) and volume from volume sensors (24A & 24B) results in clearing (142) trigger timer flag, resetting and starting (143) trigger timer. Returning (144) to parent module returns the program to reading (16C) accumulated line temperature changes or, depending on the system configuration, to reading and storing (20E) accumulated line temperature changes data.

If determining (138) if pressure offset is less than a preselected value results in the change in pressure being more than a preselected value then setting (156) invalid flag sets a flag that an invalid pressure has been read. Determining (158) pump timing flag status reads the flag and if it is set the program returns to reading (140) temperature from temperature sensor (26A, 26B, 26C, 26D) and volume from volume sensors (24A & 24B). If the pump timing flag is not set then determining (160) trigger timer flag status results in sending (162) message, resetting and starting (163) trigger timer and returning to testing (126) first pump (34A) status.

If determining (160) trigger timer flag status results in the flag not on then sending (164) message and initiating corrective action returns to reading (140) temperature from temperature sensor (26A, 26B, 26C) and volume from volume sensors (24A & 24B).

Figure 10A:
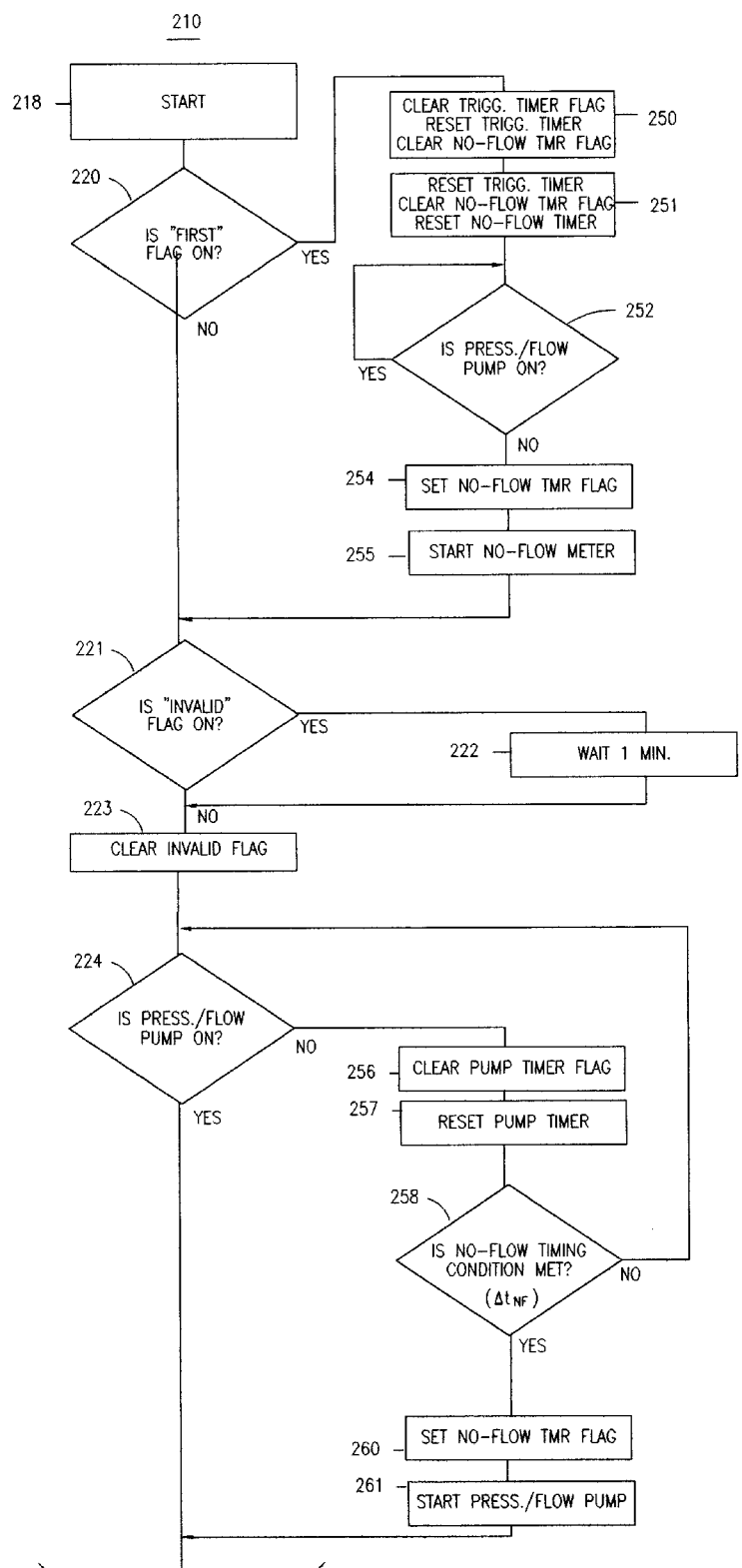
FIG. 10 is a flow diagram showing triggering snapshot for intermittent flow pipes.
Figure 10B:
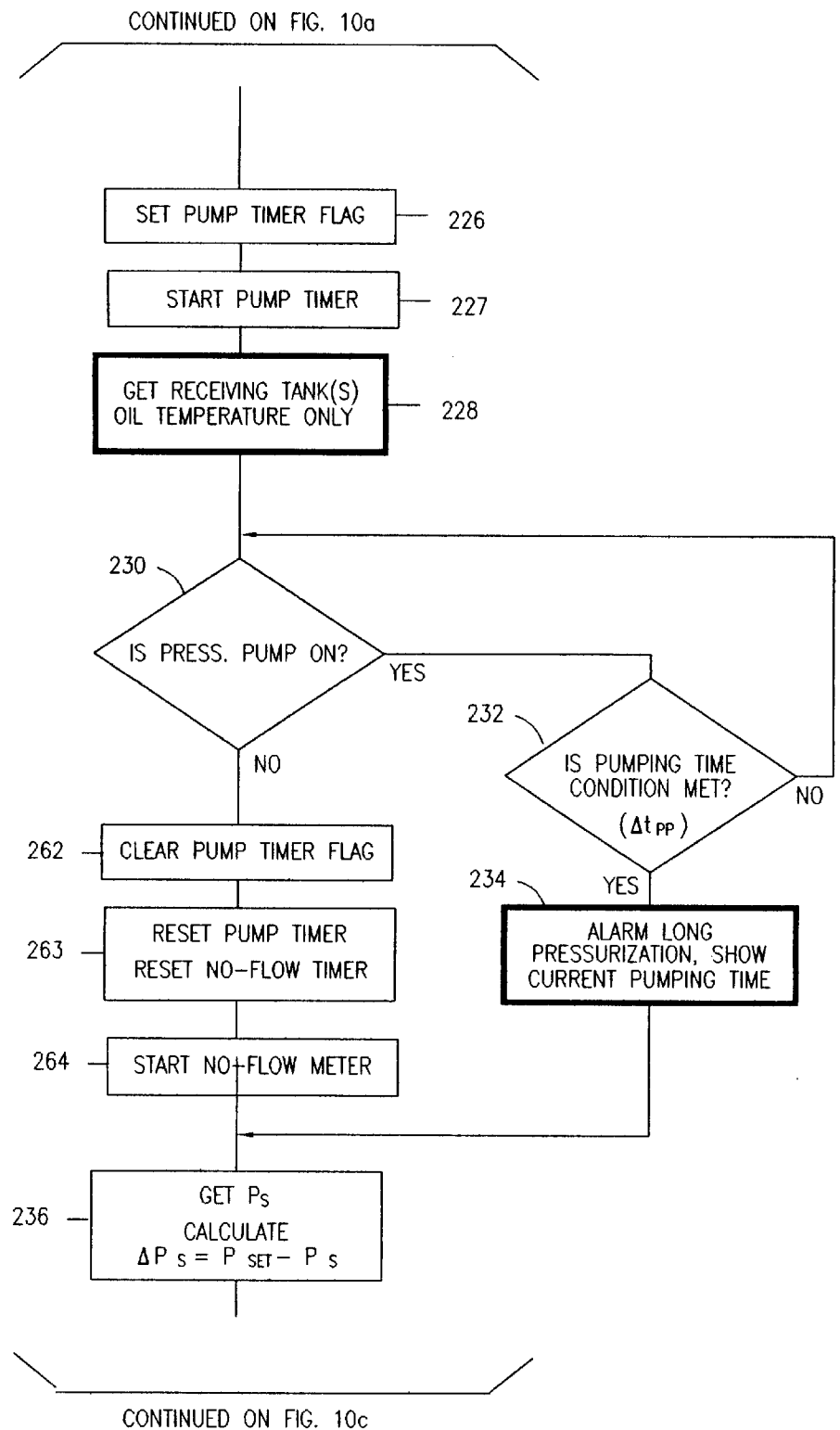
Figure 10C:
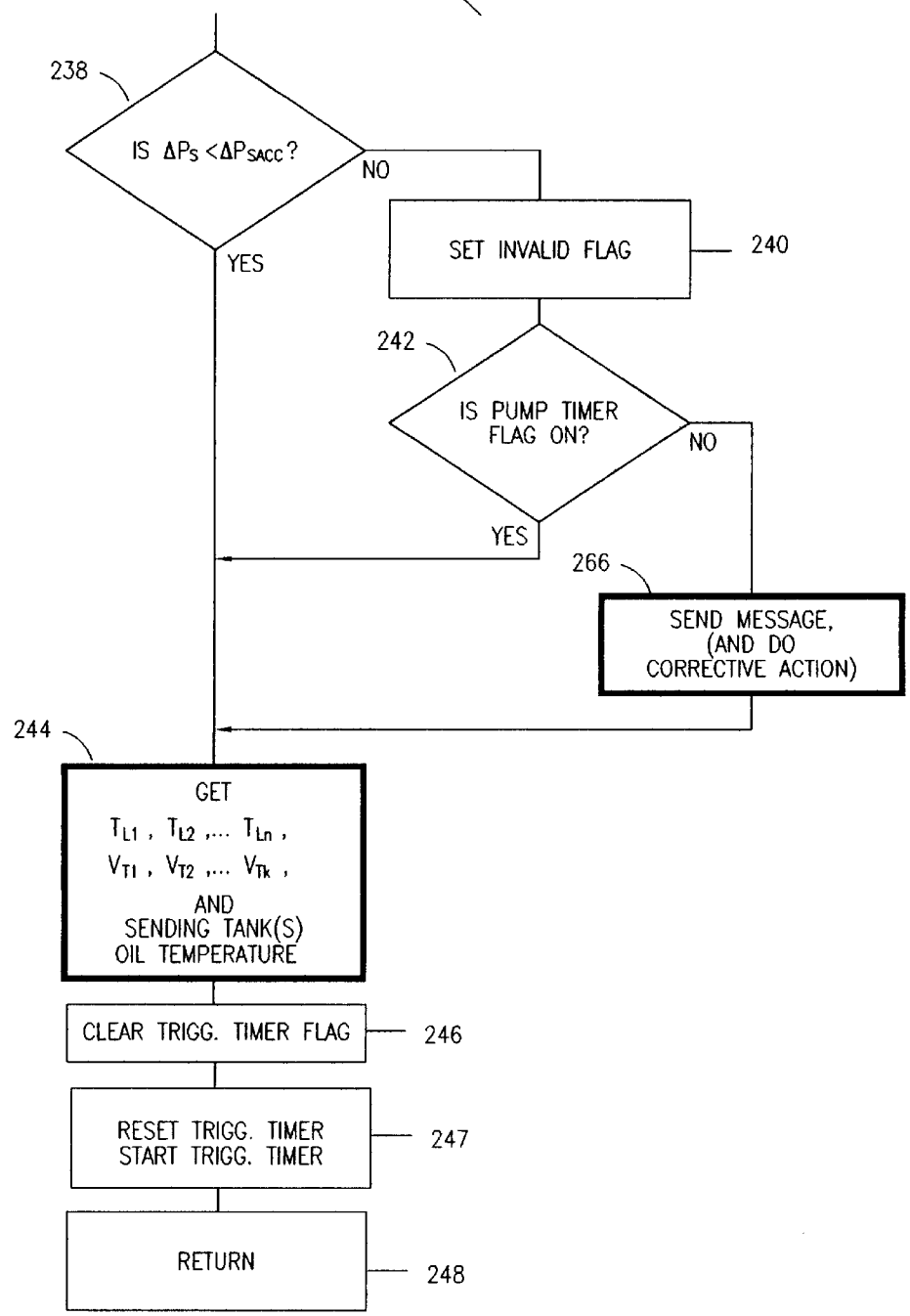

Now referring to FIG. 10 which is a flow diagram for triggering (210) snapshot for intermittent flow pipes having the following features: starting (218) snapshot readings, determining (220) 'first' flag status, determining and clearing (221) invalid flag, conditional waiting (222) one time period clearing (223) invalid flag, one time period, determining (224) pressure/flow pump status, setting (226) pump timer flag, starting (227) pump timer, reading (228) receiving tank temperature from tank temperature sensor (26B), determining (230) pressure/flow pump status, determining (232) pumping time condition, triggering and displaying (234) long pressurization alarm, reading and calculating (236) pressure and offset from pressure set point, determining (238) if pressure offset is less than a preselected value, setting (240) invalid flag, determining (242) pump timer flag status, reading (244) temperature from temperature sensors (26A, 26C . . .) and volume from volume sensors (24A & 24B), clearing (246) trigger timer flag, resetting and starting (247) trigger timer, returning (248) to parent module, clearing (250) trigger timer flag, pump timer flag, and no-flow timer flag, resetting (251) trigger timer, pump timer, and no-flow timer, determining (252) first pump (34A) status, setting (254) no-flow timer flag, starting (255) no-flow timer, clearing (256) pump timer flag, resetting (257) pump timer, determining (258) no-flow timing condition, setting (260) no-flow timer flag, starting (261) pressurization/flow pump, clearing (262) pump timer flag, resetting (263) pump timer, resetting and starting (264) no flow timer, sending (266) error message and taking corrective action.

Triggering (210) snapshot for intermitant flow pipes results in starting (218) snapshot readings, determining (220) "first" flag status, if the "first is set this results in determining and clearing (221) invalid flag, and conditional waiting (222) one time period and clearing (223) invalid flag.

If determining (220) "first" flag status which results in a "first" set then clearing (250) trigger timer flag, pump timer flag, and no-flow timer flag and resetting (251) trigger timer, pump timer, and no-flow timer occurs. Determining (252) first pump (34A) status results in program waiting for the first pump (34A) to stop. If the first pump (34A) stops then setting (254) no-flow timer flag and starting (255) no-flow timer occurs before proceeding with determining (221) invalid flag, conditional waiting (222) one time period, and clearing (223) invalid flag.

If determining (224) pressure/flow pump status indicates the first pump (34A) is not on then clearing (256) pump timer flag and resetting (257) pump timer occurs. Either the pump start or no flow timer provide exits from this loop. If determining (258) no-flow timing condition results in the no-flow timing condition being met then setting (260) no-flow timer flag and starting (261) pressurization/flow pump occurs before proceeding with setting (226) pump timer flag.

Setting (226) pump timer flag and starting (227) pump timer results in reading (228) receiving tank temperature from tank temperature sensor (26B) and determining (230) pressure/flow pump status. Only the pump stop, or meeting the pump timer condition provide exits from this loop. Meeting pumping timer condition this results in triggering and displaying (234) long pressurization alarm indicating that the pressurization is taking too long and a possible large scale leak is occurring. The program then proceeds with reading and calculating (236) pressure and offset from pressure set point.

Determining (230) pressure/flow pump status is off results in clearing (262) pump timer flag, resetting (263) pump timer, and resetting and starting (264) no flow timer before proceeding with reading and calculating (236) pressure and offset from pressure set point.

Determining (238) if pressure offset is less than a preselected value compares the current pressure offset to a stored value, if the pressure offset is not less than the stored value this results in setting (240) invalid flag which sets a flag indicating an invalid pressure reading. Determining (242) pump timer flag status checks if the meeting timing condition caused the current measurement. If the pump timer flag is on this results in reading (244) temperature from temperature sensors (26A, 26C . . . ) and volume from volume sensors (24A & 24B). If the pump timer condition did not cause low pressure readings, this results in sending (266) error message and taking corrective action which sends an error message and takes corrective action before proceeding with reading (244) temperature from temperature sensors (26A, 26C . . . ) and volume from volume sensors (24A & 24B), clearing (246) trigger timer flag, resetting and starting (247) trigger timer, and returning (248) to parent module.

Figure 11A:
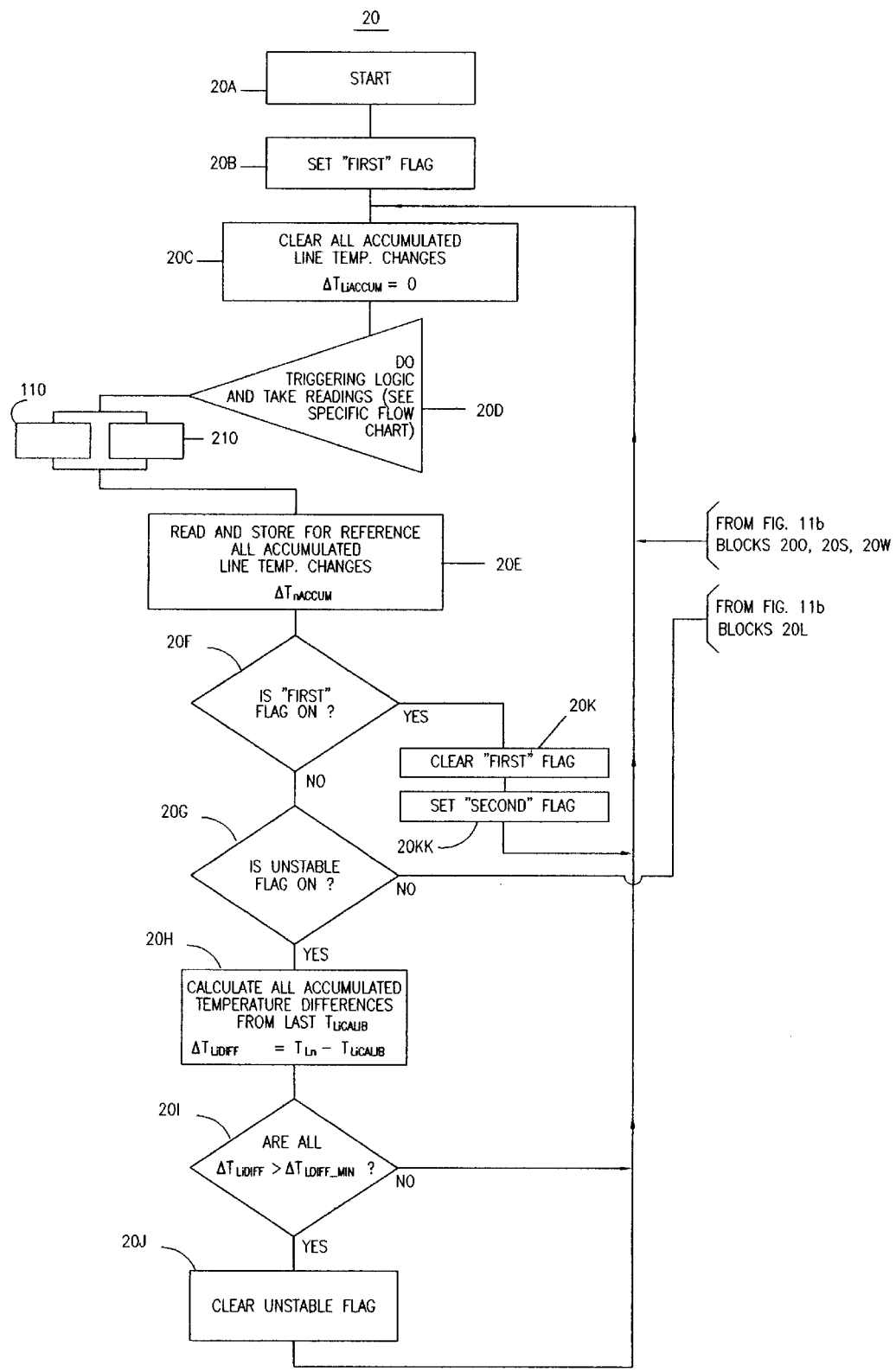
FIG. 11 is a flow diagram showing gathering of calibration data.
Figure 11B:
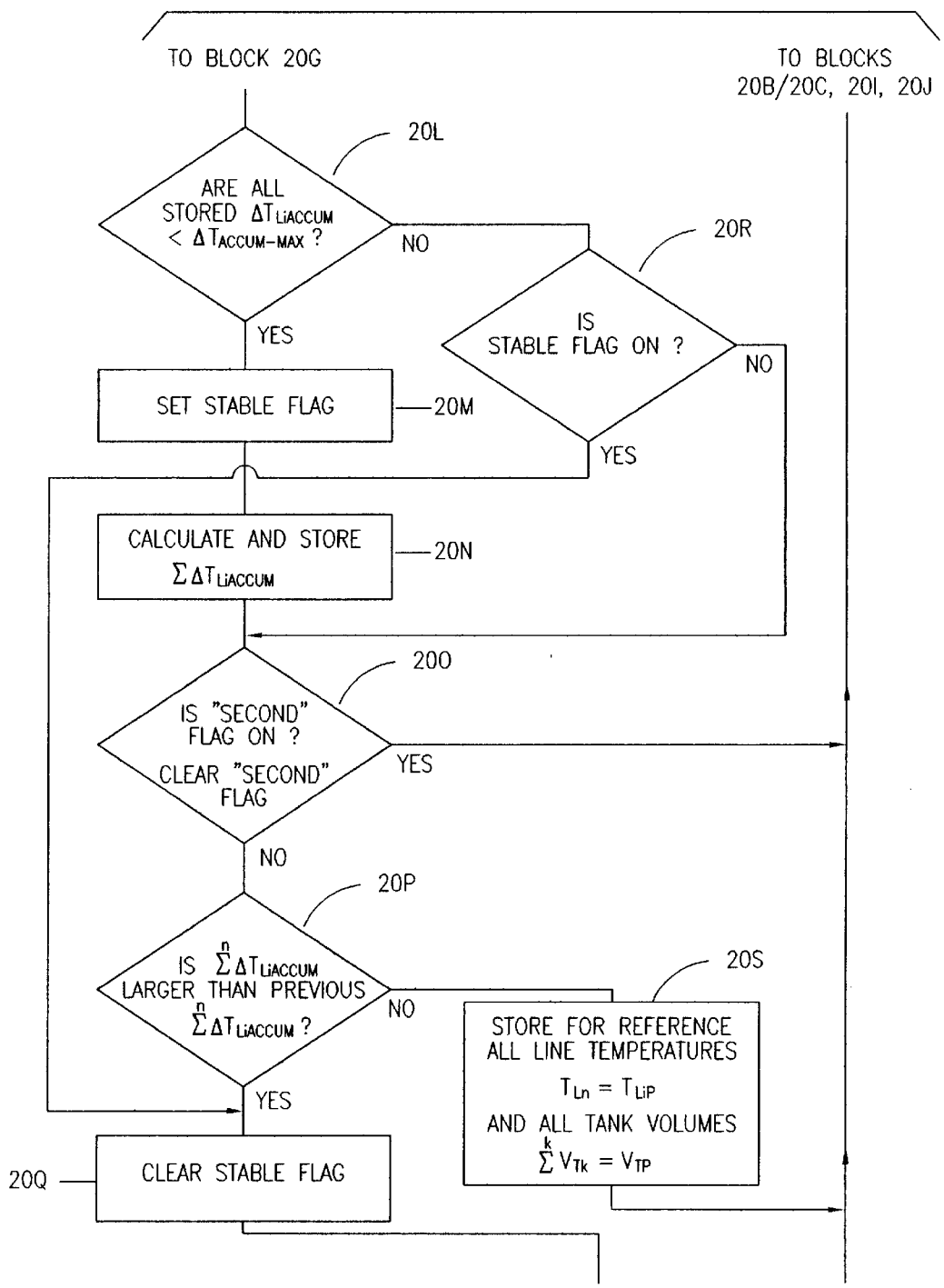
Figure 11C:
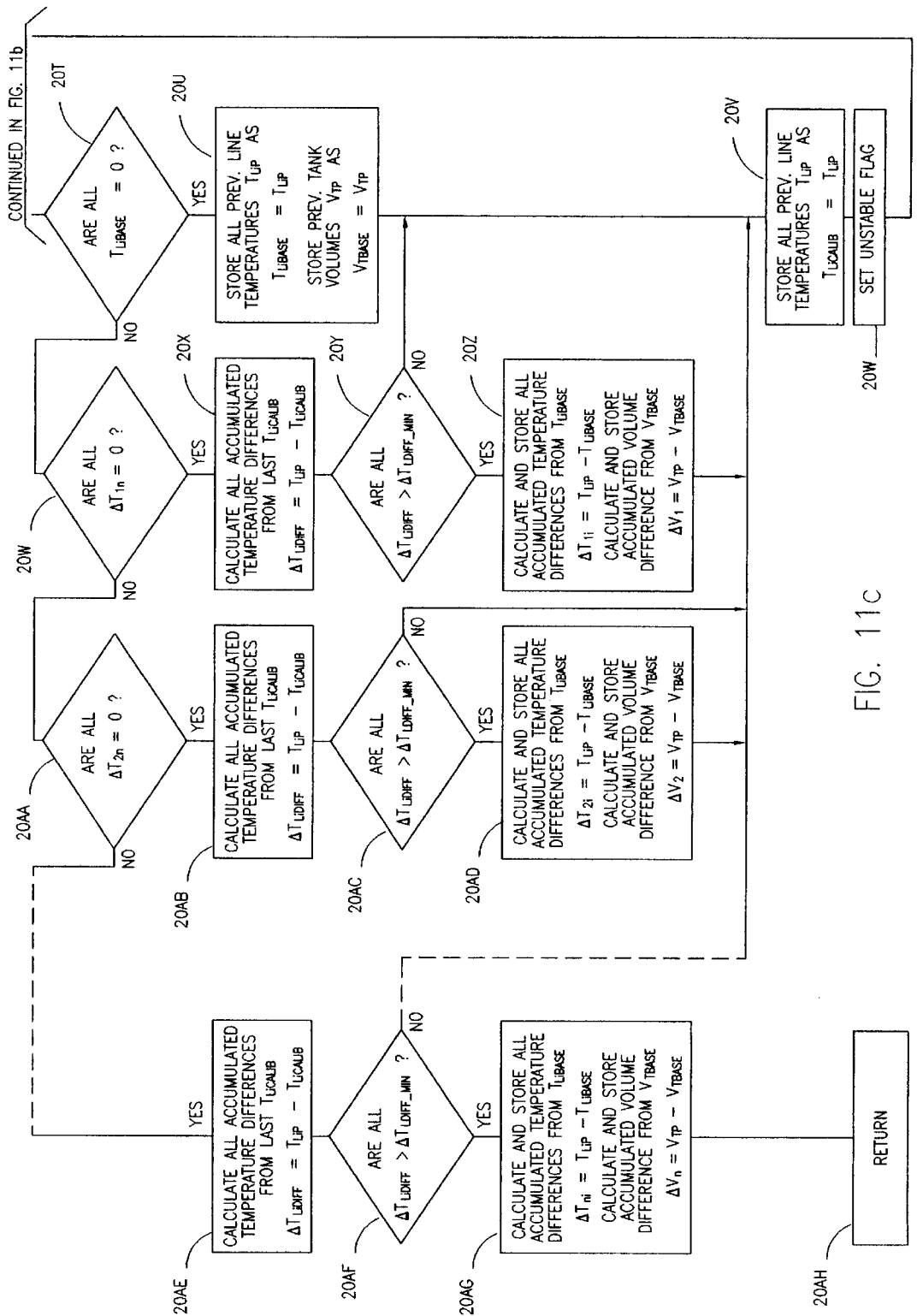

Now referring to FIG. 11 which is a flow diagram for a triggered snapshot for gathering (20) calibration data for intermittent pressurization and intermittent flow pipe having the following features: gathering (20) calibration data, starting (20A), setting (20B) "first" flag, clearing (20C) accumulated line temperature changes data, executing (20D) triggering logic, reading and storing (20E) accumulated line temperature changes data, determining (20F) "first" flag status, determining (20G) unstable flag status, calculating (20H) accumulated temperature differences from last stored valid calibration reading, determining (20I) increase in temperature change for all pipes, clearing (20J) "unstable" flag (entering waiting for stable temperature mode), clearing (20K) "first" flag, setting (20KK) "second" flag (marking second passage), determining (20L) sufficiently slow line temperature changes (valid calibration reading), setting (20M) stable flag, calculating and storing (20N) sum of accumulated line temperature changes in calibration values, determining and clearing (20O) "second" flag, determining (20P) change in sum of accumulated line temperature changes, clearing (20Q) stable flag, determining (20R) stable flag status, storing (20S) line temperatures and sum of all tank volumes, determining (20T) if all line base temperatures equal zero (establishing first calibration data set), storing (20U) previous line temperatures and tank oil volumes as base values , storing (20V) previous line temperatures and tank oil volumes as valid readings, setting (20VV) unstable flag, determining (20W) all first calibration line temperature differentials equal zero, calculating (20X) accumulated temperature differences, comparing (20Y) accumulated temperature differences to a minimum value, calculating and storing (20Z) accumulated temperature differences from a base and accumulated volume differences from a base, determining (20AA) all second calibration line temperature differentials equal to zero, calculating (20AB) accumulated temperature differences, comparing (20AC) accumulated temperature differences to a minimum value, calculating and storing (20AD) accumulated temperature differences from a base and accumulated volume differences from a base, calculating (20AE) accumulated temperature differences, comparing (20AF) accumulated temperature differences to a minimum value, calculating and storing (20AG) accumulated temperature differences from a base and accumulated volume differences from a base, return to main program.

Gathering (20) calibration data results in starting (20A) after running (18F) line temperature monitoring (12) and pressure and pressure decay monitoring (14) is executed. Setting (20B) "first" flag sets the "first" flag. Then clearing (20C) accumulated line temperature changes data erases the accumulated line temperature changes. Executing (20D) triggering logic results in, depending on system configuration, triggering snapshot for forced flow and stationary pipes (110), or in triggering (210) snapshot for intermittent flow pipes, and in volume and temperature readings from volume and temperature sensors (24A, 24B, 26A, 26B, 26C, . . . ) reading and storing (20E) accumulated line temperature changes data reads and stores the line temperature data If determining (20F) "first" flag status indicates a "first" flag on this results in clearing (20K) "first" flag and setting (20KK) "second" flag (marking second passage) then returning to clearing (20C) accumulated line temperature changes data.

If determining (20F) "first" flag status indicates a "first" flag off and determining (20G) "unstable" flag status indicates a unstable condition this results in calculating (20H) accumulated temperature differences from last stored valid calibration reading, determining (20I) increase in temperature change for all pipes and conditional clearing (20J) unstable the flag, and then returning to clearing (20C) accumulated line temperature changes data.

If determining (20F) "first" flag status indicates a "first" flag off and determining (20G) "unstable" flag status indicates a stable condition this results in determining (20L) sufficiently slow line temperature changes (valid calibration reading), are less than a preset maximum value this results in setting (20M) stable flag, calculating and storing (20N) sum of accumulated line temperature changes in calibration values.

If determining (20F) "first" flag status indicates a "first" flag off and determining (20G) "unstable" flag status indicates a stable condition this results in determining (20L) sufficiently slow line temperature changes (valid calibration reading), if the accumulated change in temperature values are larger or equal to a preset maximum value this results in determining (20R) stable flag status, if the stable flag is off this results in determining and clearing (20O) "second" flag. If the stable flag is on this results in clearing (20Q) stable flag which clears the flag.

Calculating and storing (20N) sum of accumulated line temperature changes in calibration values stores the sum of accumulated line temperature changes and results in determining and clearing (20O) "second" flag. If the "second" flag is on this results in clearing (20C) accumulated line temperature changes data. If the "second" flag is not set this results in determining (20P) change in sum of accumulated line temperature changes. If the sum accumulated temperature changes is larger than the previously calculated sum of accumulated temperature changes in temperature values then clearing (20Q) stable flag clears the stable flag. If not then this results in storing (20S) line temperatures and sum of all tank volumes for later use. At this point the system calibration is stable and is waiting for the smallest rate of line temperature changes. While in the stable mode, when an increase in the rate of change for the line temperature is sensed, the system calibration enters steps 20T through 20AH to calculate and record a set of calibration data.

Determining (20T) if all line base temperatures equal zero (establishing first calibration data set) results in a storing (20U) previous line temperatures and tank oil volumes as base values and the program goes to storing (20V) previous line temperatures and tank oil volumes as valid readings, setting (20VV) the unstable flag, waiting for sufficient line temperature change to occur before storing the next set of calibration data, after entering a new stable mode.

If determining (20T) if all line base temperatures equal zero (establishing first calibration data set) not being true and determining (20W) all first calibration line temperature differentials equal zero, results in calculating (20X) accumulated temperature differences from the last valid recorded set of calibration data Comparing (20Y) line temperature differences to a pre-set minimum value results in calculating and storing (20Z) accumulated temperature differences from a base and accumulated volume differences from a base as valid readings, if the temperature difference values are greater than a pre-set minimum value. If the temperature difference values are not larger than the minimum pre-set value then the previous line temperature values are used by storing (20V) previous line temperatures and tank oil volumes as valid readings, setting (20VV) unstable flag, and returning to clearing (20C) accumulated line temperature changes data.

If determining (20W) all first calibration line temperature differentials equal zero not being true and then determining (20AA) all second calibration line temperature differentials equal zero, results in calculating (20AB) accumulated temperature differences from the last valid recorded set of calibration data Comparing (20AC) accumulated temperature differences to a minimum value results in calculating and storing (20AD) accumulated temperature differences from a base and accumulated volume differences from abase as valid readings, if the temperature difference values are greater than a pre-set minimum value. If the temperature difference values are not larger than the minimum pre-set value then the previous line temperature values are used by storing (20V) previous line temperatures and tank oil volumes as valid readings, setting (20VV) unstable flag, and returning to clearing (20C) accumulated line temperature changes data.

Determining (20AA) all second calibration line temperature differentials equal zero not being true, results in determining the next consecutive set of all calibration temperatures in the same manner as determining (20W) all first calibration line temperatures differentials equal zero and determining (20AA) all second calibration line temperature differentials equal to zero. The last set of calibration data required by this leak detection system is obtained by calculating (20AE) accumulated temperature differences from the last valid recorded set of calibration readings calculating (20AE) accumulated temperature differences from the last valid recorded set of calibration data. Comparing (20AF) line temperature differences to a pre-set minimum value results in calculating and storing (20AG) accumulated temperature differences from a base and accumulated volume differences from a base as valid readings, if the temperature difference values are greater than a pre-set minimum value. If the temperature difference values are not larger than the minimum pre-set value then the previous line temperature values are used by storing (20V) previous line temperatures and tank oil volumes as valid readings, setting (20VV) unstable flag and returning to clearing (20C) accumulated line temperature changes data. Otherwise, this results in returning (20AH) to main program returns the program to calculating and storing (18G) λn for each pipe.

Figure 12A:
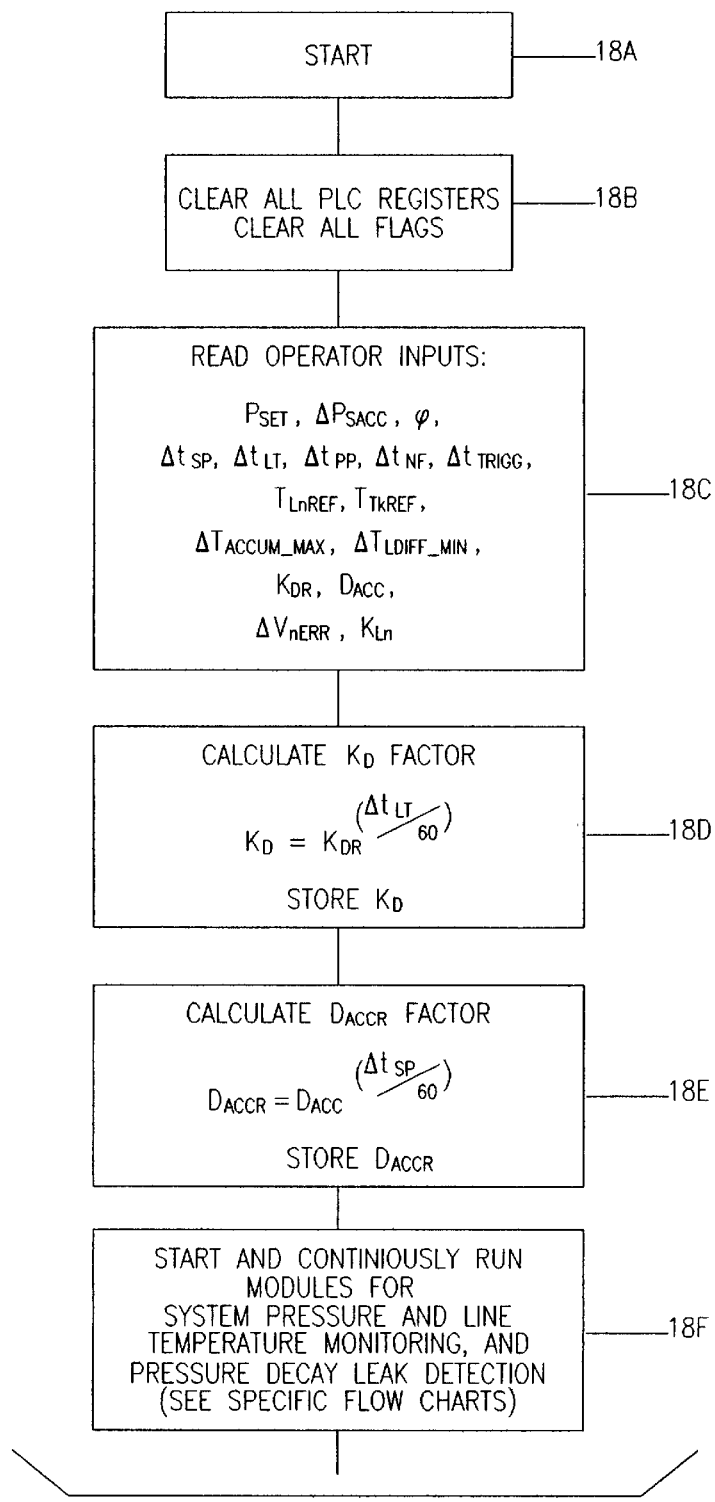
FIG. 12 is a flow diagram showing system initialization & calibration.
Figure 12B:
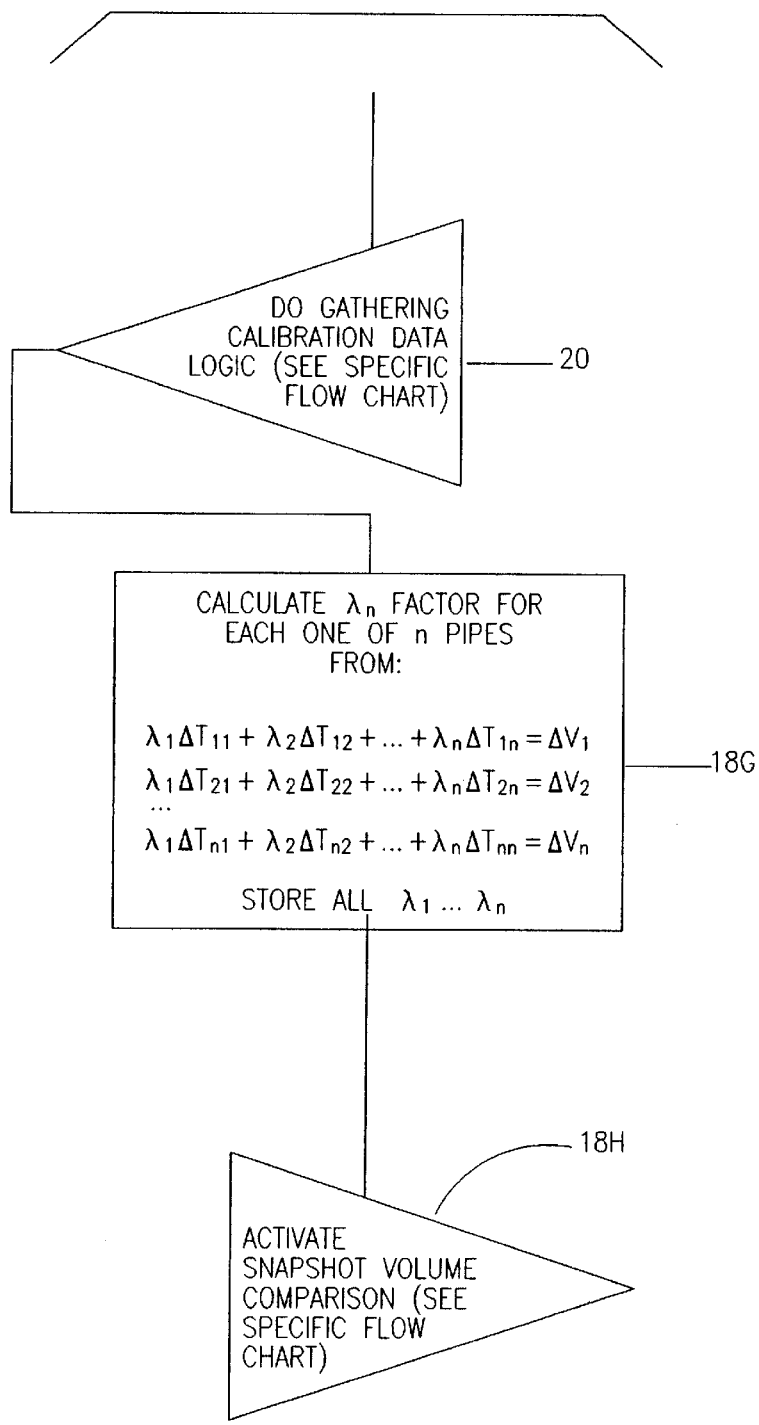

Now referring to FIG. 12 is a flow diagram showing a calibrating (18) flow diagram having the following features: starting (18A) calibration, clearing (18B) PLC registers and flags, reading (18C) operator inputs, calculating and storing (18D) $K_D$ factor, calculating and storing (18E) $D_{ACCR}$, running (18F) line temperature monitoring (12) and pressure and pressure decay monitoring (14), calculating and storing (18G) λn for each pipe, activating (18H) snap shot volume calculations (16).

Starting (18A) calibration results in clearing (18B) PLC registers and flags then reading (18C) operator inputs. Reading (18C) operator inputs results in calculating and storing (18D) the $K_D$ factor and calculating and storing (18E) $D_{ACCR}$.

Running (18F) line temperature monitoring (12) and pressure and pressure decay monitoring (14) blocks stores the values of the pressure and temperature measurements. The stored values are used in calculating and storing (18G) λn for each pipe and activating (18H) snap shot volume calculations (16).

It will be understood that each of the elements described above, or two or more together, may also find a useful application in other types of constructions differing from the type described above.

While the invention has been illustrated and described as embodied in a Leak Detection System, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A leak detection system for forced flow and stationary pipes comprising at least one first volume temperature sensor (26A) and at least one first volume sensor (24A) positioned in a first tank (38) containing fluid (32) therein, the first tank (38) is sealably connected to at least one first line (29) containing at least one electrical piped-type cable (30) with the fluid (32) therebetween, a first pump (34A) pressurizes the fluid (32) within the at least one first line (29), at least one pressure sensor (28) sensing first line (29) fluid pressure and at least one first line temperature sensor (26C) positioned to sense temperature of fluid (32) in the at least one first line (29), the leak detection system further comprising a snapshot volume comparison leak detection operation (16) method consisting of the following steps:
    A) starting (16A) volume calculation;
    B) executing (16B) triggering logic;
    C) reading (16C) accumulated line temperature changes;
    D) calculating (16D) acceptable volume deviation;
    E) clearing (16E) accumulated line temperature changes;
    F) calculating (16F) temperature differences;
    G) calculating (16G) volume adjusted for temperature;
    H) calculating (16H) volume difference;
    I) writing (16I) collected and calculated data including flags;
    J) determining (16J) if volume change is smaller than a currently acceptable value;
    K) determining (16K) alarm flag status;
    L) determining (16L) invalid flag status;
    M) tripping (16M) alarm function;
    N) reporting (16N) invalid readings.

2. A leak detection system as described in claim 1, wherein the triggering snapshot method for forced flow and stationary pipes (110) consists of the following steps:
    A) starting (118) at least one snapshot reading, which is initiated either by a gathering (20) calibration data or by a snap shot volume calculation (16);
    B) testing (120) a first flag;
    C) clearing (121) trigger timer flag and pump timer flag;
    CC) resetting (122) trigger timer and pump timer;
    D) determining (123) invalid flag;
    DD) conditional waiting (124) one time period;
    DDD) clearing (125) invalid flag
    E) testing (126) a first pump (34A) status;
    F) setting (128) a pump timer flag;
    FF) starting (129) a pump timer;
    G) testing (130) a first pump (34A) status;
    H) clearing (132) a pump timer flag;
    HH) resetting (133) a pump timer;
    I) reading and calculating (136) pressure and offset from pressure set point
    J) determining (138) if pressure offset is less than a preselected value
    K) reading (140) temperature) from a temperature sensor (26A, 26B, 26C) and volume from at least one volume sensor (24A);
    L) clearing (142) trigger timer flag;
    LL) resetting and starting (143) trigger timer;
    M) returning (144) to a parent module;
    N) clearing (146) a pump timer flag;
    NN) resetting (147) a pump timer;
    O) determining (148) a trigger timer status;
    P) setting (150) a trigger timer flag;
    Q) determining (152) a pump timing condition;
    R) tripping (154) alarm for too long pressurization time;
    S) setting (156) an invalid flag;
    T) determining (158) a pump timing flag status;
    U) determining (160) a trigger timer flag status;
    V) sending (162) a message;
    VV) resetting and starting (163) a trigger timer; and
    W) sending (164) message and initiating corrective action.

3. A leak detection system for forced flow and stationary pipes as described in claim 2 wherein the temperature measurement (12) method consists of the following steps:
    A) starting (12A) line temperature monitoring;
    B) waiting (12B) a time period;
    C) retrieving (12C) last recorded temperatures;
    D) reading and storing (12D) current line temperatures from temperature sensor (26C);
    E) calculating and storing (12E) temperature changes;
    F) reading (12F) last recorded accumulated temperature changes;
    G) calculating (12G) new accumulated lie temperature changes;
    H) updating (12H) new accumulated line temperature changes; and
    I) reading and storing (12I) current hie temperatures from temperature sensor (26C).

4. A leak detection system for forced flow and stationary pipes as described in claim 2, wherein the pressure and pressure decay monitoring (14) method consists of the following steps:
    A) starting (14A) pressure and pressure decay monitoring;
    B) waiting (14B) a time period;
    C) retrieving (14C) last recorded pressure;
    D) reading (14D) current pressure from pressure sensor (28);
    E) calculating (14E) pressure decay rate;
    F) storing (14F) pressure and pressure decay rate, reset and start system pressure timer;
    G) testing (14G) alarm reset;
    H) clearing (14H) pressure alarm flag and volume alarm flag;
    I) determining (14I) if alarm pressure flag is set;
    J) determining (14J) if pressure decay is greater than a preselected value;
    K) tripping (14K) alarm function;
    L) reading (14L) current pressure from pressure sensor (28);

M) storing (14M) pressure, reset and start system pressure timer.

5. A leak detection system for forced flow and stationary pipes as described in claim 2, wherein the calibration (18) method consists of the following steps:
   A) starting (18A) calibration;
   B) clearing (18B) PLC registers and flags;
   C) reading (18C) operator inputs;
   D) calculating and storing (18D) $K_D$ factor;
   E) calculating and storing (18E) $D_{ACCR}$;
   F) running (18F) line temperature monitoring (12) and pressure and pressure decay monitoring (14);
   G) calculating and storing (18G) λn for each pipe; and
   H) activating (18H) snap shot volume calculations (16).

6. A leak detection system for forced flow and stationary pipes as described in claim 2, wherein the gathering calibration data (20) consists of the following steps:
   A) starting (20A) gathering of calibration data (20);
   B) setting (20B) 'first' flag;
   C) clearing (20C) accumulated line temperature changes data;
   D) executing (20D) triggering logic;
   E) reading and storing (20E) accumulated line temperature changes data;
   F) determining (20F) 'first' flag status;
   G) determining (20G) 'unstable' flag status;
   H) calculating (20H) accumulated temperature differences from last stored valid calibration reading;
   I) determining (20I) increase in temperature change for all pipes;
   J) clearing (20J) 'unstable' flag (entering waiting for stable temperature mode);
   K) clearing (20K) 'first' flag;
   KK) setting (20KK) 'second' flag (marking second passage);
   L) determining (20L) sufficiently slow line temperature changes (valid calibration reading);
   M) setting (20M) stable flag;
   N) calculating and storing (20N) sum of accumulated line temperature changes in calibration values;
   O) determining and clearing (20O) 'second' flag;
   P) determining (20P) change in sum of accumulated line temperature changes;
   Q) clearing (20Q) stable flag;
   R) determining (20R) stable flag status;
   S) storing (20S) line temperatures and sum of all tank volumes;
   T) determining (20T) if all line base temperatures equal zero (establishing first calibration data set);
   U) storing (20U) previous line temperatures and tank oil volumes as base values;
   V) storing (20V) previous line temperatures and tank oil volumes as valid readings;
   VV) setting (20VV) unstable flag;
   VV) determining (20W) all first calibration line temperature differentials equal zero;
   X) calculating (20X) accumulated temperature differences;
   Y) comparing (20Y) accumulated temperature differences to a minimum value;
   Z) calculating and storing (20Z) accumulated temperature differences from a base and accumulated volume differences from a base;
   AA) determining (20AA) all second calibration line temperature differentials equal to zero;
   AB) calculating (20AB) accumulated temperature differences;
   AC) comparing (20AC) accumulated temperature differences to a minimum value;
   AD) calculating and storing (20AD) accumulated temperature differences from a base and accumulated volume differences from a base;
   AE) calculating (20AE) accumulated temperature differences from last calibration;
   AF) comparing (20AF) accumulated temperature differences to a minimum value;
   AG) calculating and storing (20AG) accumulated temperature differences from a base and accumulated volume differences from a base;
   AH) returning (20AH) to main program.

7. A leak detection system for intermittent flow pipes comprising at least one first volume temperature sensor (26A) and at least one first volume sensor (24A) positioned in a first tank (38) containing fluid (32) therein, the first tank (38) is sealably connected to at least one first line (29) containing at least one electrical piped-type cable (30) with the fluid (32) therebetween, a second tank (39) is sealably connected to the outlet of a relief valve (36) the inlet of the relief valve (36) to a distal end of at least one first line (29), a second volume sensor (24B) and a second volume temperature sensor (26B) are positioned in a second tank (39) containing fluid (32) therein, the first pump (34A) pressurizes the fluid (32) within the at least one first line (29), and circulates it from a proximal end to a distal end of a first line (29), at least one pressure sensor (28) sensing first line (29) fluid pressure and at least one first line temperature sensor (26C) positioned to sense temperature of fluid (32) in proximity of electrical piped-type cable (30) in the at least one first line (29) or at the distal end of a first line (29), the leak detection system further comprising a snapshot volume comparison leak detection operation (16) method consisting of the following steps:
   A) starting (16A) volume calculation;
   B) executing (16B) triggering logic;
   C) reading (16C) accumulated line temperature changes;
   D) calculating (16D) acceptable volume deviation;
   E) clearing (16E) accumulated line temperature changes;
   F) calculating (16F) temperature differences;
   G) calculating (16G) volume adjusted for temperature;
   H) calculating (16H) volume difference;
   I) writing (16I) collected and calculated data including flags;
   J) determining (16J) if volume change is smaller than a currently acceptable value;
   K) determining (16K) alarm flag status;
   L) determining (16L) invalid flag status;
   M) tripping (16M) alarm function;
   N) reporting (16N) invalid readings.

8. A leak detection system as described in claim 7, wherein the triggering snapshot for intermittent flow pipes (210) method consists of the following steps:
   A) starting (218) at least one snapshot reading, which is initiated either by a gathering (20) calibration data or by a snapshot volume calculation (16);

B) determining (220) 'first' flag status;

C) determining (221) invalid flag;

CC) conditional waiting (222);

CCC) clearing (223) invalid flag;

D) determining (224) pressure/flow pump status;

E) setting (226) pump timer flag;

EE) starting (227) pump timer;

F) reading (228) receiving tank temperature from tank temperature sensor (26B);

G) determining (230) pressure/flow pump status;

H) determining (232) pumping time condition;

I) triggering and displaying (234) long pressurization alarm;

J) reading and calculating (236) pressure and offset from pressure set point;

K) determining (238) if pressure offset is less than a preselected value;

L) setting (240) invalid flag;

M) determining (242) pump timer flag status;

N) reading (244) temperature from temperature sensors (26A, 26C . . . ) and volume from volume sensors (24A & 24B);

O) clearing (246) trigger timer flag;

OO) resetting and starting (247) trigger timer;

P) returning (248) to parent module;

Q) clearing (250) trigger timer flag, pump timer flag, and no-flow timer flag;

QQ) resetting (251) trigger timer, pump timer, and no-flow timer;

R) determining (252) first pump (34A) status;

S) setting (254) no-flow timer flag;

SS) starting (255) no-flow timer;

T) clearing (256) pump timer flag;

TT) resetting (257) pump timer;

U) determining (258) no-flow timing condition;

V) setting (260) no-flow timer flag;

VV) starting (261) pressurization/flow pump;

W) clearing (262) pump timer flag;

WW) resetting (263) pump timer;

WW) resetting and starting (264) no flow timer; and

X) sending (266) error message and taking corrective action.

9. A leak detection system for intermittent flow pipes as described in claim 8, wherein the temperature measurement (12) method consists of the following steps:

A) starting (12A) line temperature monitoring;

B) waiting (12B) a time period;

C) retrieving (12C) last recorded temperatures;

D) reading and storing (12D) current line temperatures from temperature sensor (26C);

E) calculating and storing (12E) temperature changes;

F) reading (12F) last recorded accumulated temperature changes;

G) calculating (12G) new accumulated line temperature changes;

H) updating (12H) new accumulated line temperature changes; and

I) reading and storing (12I) current line temperatures from temperature sensor (26C).

10. A leak detection system for intermittent flow pipes as described in claim 8, wherein the pressure and pressure decay monitoring (14) method consists of the following steps:

A) starting (14A) pressure and pressure decay monitoring;

B) waiting (14B) a time period;

C) retrieving (14C) last recorded pressure;

D) reading (14D) current pressure from pressure sensor (28);

E) calculating (14E) pressure decay rate;

F) storing (14F) pressure and pressure decay rate, reset and start system pressure timer;

G) testing (14G) alarm reset;

H) clearing (14H) pressure alarm flag and volume alarm flag;

I) determining (14I) if alarm pressure flag is set;

J) determining (14J) if pressure decay is greater than a preselected value;

K) tripping (14K) alarm function;

L) reading (14L) current pressure from pressure sensor (28);

M) storing (14M) pressure, reset and start system pressure timer.

11. A leak detection system for intermittent flow pipes as described in claim 8, wherein the calibration (18) method consists of the following steps:

A) starting (18A) calibration;

B) clearing (18B) PLC registers and flags;

C) reading (18C) operator inputs;

D) calculating and storing (18D) $K_D$ factor;

E) calculating and storing (18E) $D_{ACCR}$,

F) running (18F) line temperature monitoring (12) and pressure and pressure decay monitoring (14);

G) calculating and storing (18G) $\lambda$n for each pipe; and

H) activating (18H) snap shot volume calculations (16).

12. A leak detection system for intermittent flow pipes as described in claim 8, wherein the gathering calibration data (20) method consists of the following steps:

A) starting (20A) gathering of calibration data (20);

B) setting (20B) 'first' flag;

C) clearing (20C) accumulated line temperature changes data;

D) executing (20D) triggering logic;

E) reading and storing (20E) accumulated line temperature changes data;

F) determining (20F) 'first' flag status;

G) determining (20G) 'unstable' flag status;

H) calculating (20H) accumulated temperature differences from last stored valid calibration reading;

I) determining (20I) increase in temperature change for all pipes;

J) clearing (20J) 'unstable' flag (entering waiting for stable temperature mode);

K) clearing (20K) 'first' flag;

KK) setting (20KK) 'second' flag (marking second passage);

L) determining (20L) sufficiently slow line temperature changes (valid calibration reading);

M) setting (20M) stable flag;

N) calculating and storing (20N) sum of accumulated line temperature changes in calibration values;

O) determining and clearing (20O) 'second' flag;

P) determining (20P) change in sum of accumulated line temperature changes;

Q) clearing (20Q) stable flag;

R) determining (20R) stable flag status;

S) storing (20S) line temperatures and sum of all tank volumes;

T) determining (20T) if all line base temperatures equal zero (establishing first calibration data set);

U) storing (20U) previous line temperatures and tank oil volumes as base values;

V) storing (20V) previous line temperatures and tank oil volumes as valid readings;

VV) setting (20VV) unstable flag;

W) determining (20W) all first calibration line temperature differentials equal zero;

X) calculating (20X) accumulated temperature differences;

Y) comparing (20Y) accumulated temperature differences to a minimum value;

Z) calculating and storing (20Z) accumulated temperature differences from a base and accumulated volume differences from a base;

AA) determining (20AA) all second calibration line temperature differentials equal to zero;

AB) calculating (20AB) accumulated temperature differences;

AC) comparing (20AC) accumulated temperature differences to a minimum value;

AD) calculating and storing (20AD) accumulated temperature differences from a base and accumulated volume differences from a base;

AE) calculating (20AE) accumulated temperature differences from last calibration;

AF) comparing (20AF) accumulated temperature differences to a minimum value;

AG) calculating and storing (20AG) accumulated temperature differences from a base and accumulated volume differences from a base;

AH) returning (20AH) to main program.

13. A leak detection system for forced flow and stationary pipes comprising at least one first volume temperature sensor (26A) and at least one first volume sensor (24A) positioned in a first tank (38) containing fluid (32) therein, the first tank (38) is sealably connected to at least one first line (29) containing at least one electrical piped-type cable (30) with the fluid (32) therebetween, a first pump (34A) pressurizes the fluid (32) within the at least one first line (29), at least one pressure sensor (28) sensing first line (29) fluid pressure and at least one first line temperature sensor (26C) positioned to sense temperature of fluid (32) in the at least one first line (29), the leak detection system further comprising a method for triggering snapshot for forced flow and stationary pipes (110), consisting of the following steps:

A) starting (118) at least one snapshot reading, which is initiated either by a gathering (20) calibration data or by a snap shot volume calculation (16);

B) testing (120) a first flag;

C) clearing (121) trigger timer flag and pump timer flag;

CC) resetting (122) trigger timer and pump timer;

D) determining (123) invalid flag;

DD) conditional waiting (124) one time period;

DDD) clearing (125) invalid flag;

E) testing (126) a first pump (34A) status;

F) setting (128) a pump timer flag;

FF) starting (129) a pump timer;

G) testing (130) a first pump (34A) status;

H) clearing (132) a pump timer flag;

HH) resetting (133) a pump timer;

I) reading and calculating (136) pressure and offset from pressure set point;

J) determining (138) if pressure offset is less than a preselected value;

K) reading (140) temperature) from a temperature sensor (26A, 26B, 26C) and volume from at least one volume sensor (24A);

L) clearing (142) trigger timer flag;

LL) resetting and starting (143) trigger timer;

M) returning (144) to a parent module;

N) clearing (146) a pump timer flag;

NN) resetting (147) a pump timer;

O) determining (148) a trigger timer status;

P) setting (150) a trigger timer flag;

Q) determining (152) a pump timing condition;

R) tripping (154) alarm for too long pressurization time;

S) setting (156) an invalid flag;

T) determining (158) a pump timing flag status;

U) determining (160) a trigger timer flag status;

V) sending (162) a message;

VV) resetting and starting (163) a trigger timer; and

W) sending (164) message and initiating corrective action.

14. A leak detection system for forced flow and stationary pipes as described in claim 13, wherein the line temperature monitoring (12) method consists of the following steps:

A) starting (12A) line temperature monitoring;

B) waiting (12B) a time period;

C) retrieving (12C) last recorded temperatures;

D) reading and storing (12D) current line temperatures from temperature sensor (26C);

E) calculating and storing (12E) temperature changes;

F) reading (12F) last recorded accumulated temperature changes;

G) calculating (12G) new accumulated line temperature changes;

H) updating (12H) new accumulated line temperature changes; and

D) reading and storing (12I) current line temperatures from temperature sensor (26C).

15. A leak detection system for forced flow and stationary pipes as described in claim 13, wherein the pressure and pressure decay monitoring (14) method consists of the following steps:

A) starting (14A) pressure and pressure decay monitoring;

B) waiting (14B) a time period;

C) retrieving (14C) last recorded pressure;

D) reading (14D) current pressure from pressure sensor (28);

E) calculating (14E) pressure decay rate;

F) storing (14F) pressure and pressure decay rate, reset and start system pressure timer;

G) testing (14G) alarm reset;

H) clearing (14H) pressure alarm flag and volume alarm flag;

I) determining (14I) if alarm pressure flag is set;

J) determining (14J) if pressure decay is greater than a preselected value;

K) tripping (14K) alarm function;

L) reading (14L) current pressure from pressure sensor (28);

M) storing (14M) pressure, reset and start system pressure timer.

16. A leak detection system for forced flow and stationary pipes as described in claim 13, wherein the snap shot volume calculations (16) method consists of the following steps:

A) starting (16A) volume calculation;

B) executing (16B) triggering logic;

C) reading (16C) accumulated line temperature changes;

D) calculating (16D) acceptable volume deviation;

E) clearing (16E) accumulated line temperature changes;

F) calculating (16F) temperature differences;

G) calculating (16G) volume adjusted for temperature;

H) calculating (16H) volume difference;

I) writing (16I) collected and calculated data including flags;

J) determining (16J) if volume change is smaller than a currently acceptable value;

K) determining (16K) alarm flag status;

L) determining (16L) invalid flag status;

M) tripping (16M) alarm function;

N) reporting (16N) invalid readings.

17. A leak detection system for forced flow and stationary pipes as described in claim 13, wherein the calibration (18) method consists of the following steps:

A) starting (18A) calibration;

B) clearing (18B) PLC registers and flags;

C) reading (18C) operator inputs;

D) calculating and storing (18D) $K_D$ factor;

E) calculating and storing (18E) $D_{ACCR}$;

F) running (18F) line temperature monitoring (12) and pressure and pressure decay monitoring (14);

G) calculating and storing (18G) λn for each pipe; and

H) activating (18H) snap shot volume calculations (16).

18. A leak detection system for forced flow and stationary pipes as described in claim 13, wherein the gathering (20) method calibration data consists of the following steps:

A) starting (20A) gathering of calibration data (20);

B) setting (20B) 'first' flag;

C) clearing (20C) accumulated line temperature changes data;

D) executing (20D) triggering logic;

E) reading and storing (20E) accumulated line temperature changes data;

F) determining (20F) 'first' flag status;

G) determining (20G) 'unstable' flag status;

H) calculating (20H) accumulated temperature differences from last stored valid calibration reading;

I) determining (20I) increase in temperature change for all pipes;

J) clearing (20J) 'unstable' flag (entering waiting for stable temperature mode);

K) clearing (20K) 'first' flag;

KK) setting (20KK) 'second' flag (marking second passage);

L) determining (20L) sufficiently slow line temperature changes (valid calibration reading);

M) setting (20M) stable flag;

N) calculating and storing (20N) sum of accumulated line temperature changes in calibration values;

O) determining and clearing (20O) 'second' flag;

P) determining (20P) change in sum of accumulated line temperature changes;

Q) clearing (20Q) stable flag;

R) determining (20R) stable flag status;

S) storing (20S) line temperatures and sum of all tank volumes;

T) determining (20T) if all line base temperatures equal zero (establishing first calibration data set);

U) storing (20U) previous fine temperatures and tank oil volumes as base values;

V) storing (20V) previous line temperatures and tank oil volumes as valid readings;

VV) setting (20VV) unstable flag;

W) determining (20W) all first calibration line temperature differentials equal zero;

X) calculating (20X) accumulated temperature differences;

Y) comparing (20Y) accumulated temperature differences to a minimum value;

Z) calculating and storing (20Z) accumulated temperature differences from a base and accumulated volume differences from a base;

AA) determining (20AA) all second calibration line temperature differentials equal to zero;

AB) calculating (20AB) accumulated temperature differences;

AC) comparing (20AC) accumulated temperature differences to a minimum value;

AD) calculating and storing (20AD) accumulated temperature differences from a base and accumulated volume differences from a base;

AE) calculating (20AE) accumulated temperature differences from last calibration;

AF) comparing (20AF) accumulated temperature differences to a minimum value;

AG) calculating and storing (20AG) accumulated temperature differences from a base and accumulated volume differences from a base;

AH) returning (20AH) to main program.

19. A leak detection system for intermittent flow pipes comprising at least one first volume temperature sensor (26A) and at least one first volume sensor (24A) positioned in a first tank (38) containing fluid (32) therein, the first tank (38) is sealably connected to at least one first line (29) containing at least one electrical piped-type cable (30) with the fluid (32) therebetween, a second tank (39) is sealably connected to the outlet of a relief valve (36) the inlet of the relief valve (36) to a distal end of at least one first line (29), a second volume sensor (24B) and a second volume temperature sensor (26B) are positioned in a second tank (39) containing fluid (32) therein, the first pump (34A) pressurizes the fluid (32) within the at least one first line (29), and circulates it from a proximal end to a distal end of a first line (29), at least one pressure sensor (28) sensing first line (29) fluid pressure and at least one first line temperature sensor (26C) positioned to sense temperature of fluid (32) in proximity of electrical piped-type cable (30) in the at least one first line (29) or at the distal end of a first line (29), the leak detection system further comprises a method for triggering (210) snapshot for intermittent flow pipes consisting of the following steps:

A) starting (218) at least one snapshot reading, which is initiated either by a gathering (20) calibration data or by a snapshot volume calculation (16);

B) determining (220) 'first' flag status;

C) determining (221) invalid flag;

CC) conditional waiting (222);

CCC) clearing (223) invalid flag;

D) determining (224) pressure/flow pump status;

E) setting (226) pump timer flag;

EE) starting (227) pump timer;

F) reading (228) receiving tank temperature from tank temperature sensor (26B);

G) determining (230) pressure/flow pump status;

H) determining (232) pumping time condition;

I) triggering and displaying (234) long pressurization alarm;

J) reading and calculating (236) pressure and offset from pressure set point;

K) determining (238) if pressure offset is less than a preselected value;

L) setting (240) invalid flag;

M) determining (242) pump timer flag status;

N) reading (244) temperature from temperature sensors (26A, 26C . . . ) and volume from volume sensors (24A & 24B);

O) clearing (246) trigger timer flag;

OO) resetting and starting (247) trigger timer;

P) returning (248) to parent module;

Q) clearing (250) trigger timer flag, pump timer flag, and no-flow timer flag;

QQ) resetting (251) trigger timer, pump timer, and no-flow timer ;

R) determining (252) first pump (34A) status;

S) setting (254) no-flow timer flag;

SS) starting (255) no-flow timer;

T) clearing (256) pump timer flag;

TT) resetting (257) pump timer;

U) determining (258) no-flow timing condition;

V) setting (260) no-flow timer flag;

VV) starting (261) pressurization/flow pump;

W) clearing (262) pump timer flag;

WW) resetting (263) pump timer;

WW) resetting and starting (264) no flow timer; and

X) sending (266) error message and taking corrective action.

20. A leak detection system for intermittent flow pipes as described in claim 19, wherein the line temperature monitoring (12) consists of the following steps:

A) starting (12A) line temperature monitoring;

B) waiting (12B) a time period;

C) retrieving (12C) last recorded temperatures;

D) reading and storing (12D) current line temperatures from temperature sensor (26C);

E) calculating and storing (12E) temperature changes;

F) reading (12F) last recorded accumulated temperature changes;

G) calculating (12G) new accumulated line temperature changes;

H) updating (12H) new accumulated line temperature changes; and

I) reading and storing (12I) current line temperatures from temperature sensor (26C).

21. A leak detection system for intermittent flow pipes as described in claim 19, wherein the pressure and pressure decay monitoring (14) method consists of the following steps:

A) starting (14A) pressure and pressure decay monitoring;

B) waiting (14B) a time period;

C) retrieving (14C) last recorded pressure;

D) reading (14D) current pressure from pressure sensor (28);

E) calculating (14E) pressure decay rate;

F) storing (14F) pressure and pressure decay rate, reset and start system pressure timer;

G) testing (14G) alarm reset;

H) clearing (14H) pressure alarm flag and volume alarm flag;

I) determining (14I) if alarm pressure flag is set,

J) determining (14J) if pressure decay is greater than a preselected value;

K) tripping (14K) alarm function;

L) reading (14L) current pressure from pressure sensor (28); and

M) storing (14M) pressure, reset and start system pressure timer.

22. A leak detection system for intermittent flow pipes as described in claim 19, wherein the snap shot volume calculations (16) consists of the following steps:

A) starting (16A) volume calculation;

B) executing (16B) triggering logic;

C) reading (16C) accumulated line temperature changes;

D) calculating (16D) acceptable volume deviation;

E) clearing (16E) accumulated line temperature changes;

F) calculating (16F) temperature differences;

G) calculating (16G) volume adjusted for temperature;

H) calculating (16H) volume difference;

I) writing (16I) collected and calculated data including flags;

J) determining (16J) if volume change is smaller than a currently acceptable value;

K) determining (16K) alarm flag status;

L) determining (16L) invalid flag status;

M) tripping (16M) alarm function; and

N) reporting (16N) invalid readings.

23. A leak detection system for intermittent flow pipes as described in claim 19, wherein the calibration (18) consists of the following steps:

A) starting (18A) calibration;

B) clearing (18B) PLC registers and flags;

C) reading (18C) operator inputs;

D) calculating and storing (18D) $K_D$ factor;

E) calculating and storing (18E) $D_{ACCR}$;

F) running (18F) line temperature monitoring (12) and pressure and pressure decay monitoring (14);

G) calculating and storing (18G) An for each pipe; and

H) activating (18H) snap shot volume calculations (16).

24. A leak detection system for intermittent flow pipes as described in claim 19, wherein the gathering (20) calibration data consists of the following steps:

A) starting (20A) gathering of calibration data (20);

B) setting (20B) 'first' flag;

C) clearing (20C) accumulated line temperature changes data;

D) executing (20D) triggering logic;

E) reading and storing (20E) accumulated line temperature changes data;

F) determining (20F) 'first' flag status;

G) determining (20G) 'unstable' flag status;

H) calculating (20H) accumulated temperature differences from last stored valid calibration reading;

I) determining (20I) increase in temperature change for all pipes;

J) clearing (20J) 'unstable' flag (entering waiting for stable temperature mode);

K) clearing (20K) 'first' flag;

KK) setting (20KK) 'second' flag (marking second passage);

L) determining (20L) sufficiently slow line temperature changes (valid calibration reading);

M) setting (20M) stable flag;

N) calculating and storing (20N) sum of accumulated line temperature changes in calibration values;

O) determining and clearing (20O) 'second' flag;

P) determining (20P) change in sum of accumulated line temperature changes;

Q) clearing (20Q) stable flag;

R) determining (20R) stable flag status;

S) storing (20S) line temperatures and sum of all tank volumes;

T) determining (20T) if all line base temperatures equal zero (establishing first calibration data set);

U) storing (20U) previous line temperatures and tank oil volumes as base values;

V) storing (20V) previous line temperatures and tank oil volumes as valid readings;

VV) setting (20VV) unstable flag;

W) determining (20W) all first calibration line temperature differentials equal zero;

X) calculating (20X) accumulated temperature differences;

Y) comparing (20Y) accumulated temperature differences to a minimum value;

Z) calculating and storing (20Z) accumulated temperature differences from a base and accumulated volume differences from a base;

AA) determining (20AA) all second calibration line temperature differentials equal to zero;

AB) calculating (20AB) accumulated temperature differences;

AC) comparing (20AC)—accumulated temperature differences to a minimum value;

AD) calculating and storing (20AD) accumulated temperature differences from a base and accumulated volume differences from a base;

AE) calculating (20AE) accumulated temperature differences from last calibration;

AF) comparing (20AF) accumulated temperature differences to a minimum value;

AG) calculating and storing (20AG) accumulated temperature differences from a base and accumulated volume differences from a base; and AH) returning (20AH) to main program.

* * * * *